United States Patent
Hirota et al.

(10) Patent No.: US 11,333,956 B2
(45) Date of Patent: May 17, 2022

(54) IMAGE PICKUP APPARATUS TO WHICH ACCESSORY IS REMOVABLY ATTACHED, AND IMAGE PICKUP SYSTEM

(71) Applicant: CANON KABUSHIKI KAISHA, Tokyo (JP)

(72) Inventors: Norikazu Hirota, Chigasaki (JP); Kouichi Shigeta, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/925,992

(22) Filed: Jul. 10, 2020

(65) Prior Publication Data
US 2020/0341352 A1 Oct. 29, 2020

Related U.S. Application Data

(62) Division of application No. 15/924,918, filed on Mar. 19, 2018, now Pat. No. 10,732,491.

(30) Foreign Application Priority Data

Mar. 24, 2017 (JP) .............................. JP2017-059171
Mar. 24, 2017 (JP) .............................. JP2017-059172

(Continued)

(51) Int. Cl.
*G03B 17/56* (2021.01)
*H04N 5/225* (2006.01)
*H04N 5/232* (2006.01)

(52) U.S. Cl.
CPC ......... *G03B 17/563* (2013.01); *G03B 17/565* (2013.01); *H04N 5/2252* (2013.01);
(Continued)

(58) Field of Classification Search
USPC ........................................................ 396/425
See application file for complete search history.

(56) References Cited

U.S. PATENT DOCUMENTS

| | | | | |
|---|---|---|---|---|
| 4,959,729 A * | 9/1990 | Fukuda | ............ | H04N 5/225251 348/375 |
| 7,042,499 B1 * | 5/2006 | Kido | ................... | H04N 1/00204 348/211.14 |

(Continued)

FOREIGN PATENT DOCUMENTS

| | | |
|---|---|---|
| CN | 1779314 A | 5/2006 |
| JP | H01246968 A | 10/1989 |

(Continued)

OTHER PUBLICATIONS

Office Action issued in Japanese Appln. No. 2017-147967 dated Nov. 13, 2018.

(Continued)

*Primary Examiner* — Clayton E. LaBalle
*Assistant Examiner* — Warren K Fenwick
(74) *Attorney, Agent, or Firm* — Rossi, Kimms & McDowell LLP

(57) ABSTRACT

An image pickup apparatus that suppresses looseness of an accessory fastened to a fastening portion of an apparatus body. An image pickup apparatus includes an accessory that includes a pair of fastening members, and an apparatus body including two fastening portions to which the accessory is removably fastened using the pair of fastening members. The accessory is provided with a second fitting portion which is fitted to one of first fitting portions formed around the fastening portions, by protrusion-recess fitting, in a state in which the accessory is fastened to the fastening portions of the apparatus body using the fastening members. One of the first fitting portion and the second fitting portion is (Continued)

formed by two fitting portions provided in association with the fastening members, and the other is formed by at least one fitting portion.

45 Claims, 29 Drawing Sheets

(30) Foreign Application Priority Data

Mar. 24, 2017 (JP) .............................. JP2017-059173
Jul. 31, 2017 (JP) .............................. JP2017-147967

(52) U.S. Cl.
CPC ....... *H04N 5/2254* (2013.01); *H04N 5/23216* (2013.01); *H04N 5/23293* (2013.01)

(56) References Cited

U.S. PATENT DOCUMENTS

| 7,386,330 | B2 | 6/2008 | Takagi | |
| 7,604,423 | B2* | 10/2009 | Nagata | G03B 19/07 |
| | | | | 348/375 |
| 7,956,922 | B2 | 6/2011 | Kaji | |
| 8,692,922 | B2 | 4/2014 | Akiyama | |
| 9,113,060 | B2* | 8/2015 | Akiyama | H04N 5/23293 |
| 10,732,491 | B2* | 8/2020 | Hirota | H04N 5/2252 |
| 2004/0160523 | A1* | 8/2004 | Mogi | H04N 5/2252 |
| | | | | 348/333.07 |
| 2013/0038769 | A1 | 2/2013 | Xiaoping | |
| 2015/0062418 | A1* | 3/2015 | Matsumoto | G03B 31/00 |
| | | | | 348/373 |
| 2017/0255084 | A1 | 9/2017 | Yoneda | |

FOREIGN PATENT DOCUMENTS

| JP | H08270638 | A | 10/1996 |
| JP | H10290385 | A | 10/1998 |
| JP | H11182528 | A | 7/1999 |
| JP | 2004226999 | A | 8/2004 |
| JP | 2005291384 | A | 10/2005 |
| JP | 2006125560 | A | 5/2006 |
| JP | 2008288920 | A | 11/2008 |
| JP | 2010156363 | A | 7/2010 |
| JP | 2012123305 | A | 6/2012 |
| JP | 2013097116 | A | 5/2013 |
| JP | 2014150491 | A | 8/2014 |
| JP | 2016051001 | A | 4/2016 |
| JP | 5943580 | B2 | 7/2016 |
| JP | 2016219885 | A | 12/2016 |

OTHER PUBLICATIONS

Office Action issued in U.S. Appl. No. 15/924,918 dated Oct. 21, 2019.
Notice of Allowance issued in U.S. Appl. No. 15/924,918 dated Apr. 8, 2020.
Office Action issued in Japanese Appln. No. 2019-230299 dated Oct. 27, 2020.
Office Action issued in Japanese Appln. No. 2021-015249 dated Mar. 8, 2022.

* cited by examiner

UPWARD
RIGHT ← → LEFT

IMAGE PICKUP APPARATUS TO WHICH ACCESSORY IS REMOVABLY ATTACHED, AND IMAGE PICKUP SYSTEM

BACKGROUND OF THE INVENTION

Field of the Invention

The present invention relates to an image pickup apparatus provided with an accessory attachment portion to which an accessory is removably attached, and an image pickup system including the image pickup apparatus.

Description of the Related Art

Conventionally, there has been proposed an image pickup apparatus, such as a video camera, including an accessory attachment portion provided on an apparatus body, such as an accessory shoe, which is formed by bending opposite sides of a flat plate inward, respectively. Various accessories are interchangeably attached to the accessory attachment portion, and each accessory is fastened with fastening means, such as a screw (Japanese Laid-Open Patent Publication (Kokai) No. 2004-226999).

Further, there is a demand that an accessory is capable of being set in various positions on the image pickup apparatus. For example, a display panel as the accessory is not only set on the rear or a side of an image pickup apparatus body such that the display surface of the display panel is opposed to a photographer, but also is attached to a handle provided on the top of the apparatus body. Further, there is a case where an optical viewfinder is attached to the display panel so as to enable the user to check a photographed image in a bright environment. To realize these various positions of the display panel, a hinge unit having a high degree of freedom is sometimes arranged between the apparatus body and the display panel.

It is essentially important that the hinge unit is configured to be capable of stably holding the display panel in a desired posture. For example, when the display panel is in a position in which the display surface thereof is opposed to the photographer, the hinge unit is required to prevent the display panel from being easily rotated by a slight operation load applied from a photographer. To meet the requirement, there has been known a technique for restricting rotation of the hinge unit by fixing a rotating shaft of the hinge unit with a screw (Japanese Laid-Open Patent Publication (Kokai) No. 2016-51001).

Further, in a case where the display panel as an accessory is connected via a hinge unit mounted on the image pickup apparatus body with a handle, it is desired that the posture of the display panel can be changed and the display panel can be positioned beside or above the handle. It is also demanded that a display section of the display panel can be turned toward a photographer, or the display section can be set to a position opposed to the image pickup apparatus body to thereby place the display panel in an accommodated state.

To meet these requirements, there has been proposed a technique in which the display panel and an operation section are made rotatable with respect to the accessory attachment portion, and the user is enabled to operate the operation section while facing toward the display panel (Japanese Patent No. 5943580). Further, Japanese Laid-Open Patent Publication (Kokai) No. 2016-51001 describes an arrangement in which the display panel can be rotated about a supporting shaft protruding from the image pickup apparatus body in a horizontal direction, and the distance from the supporting shaft to the display panel can be adjusted.

Further, there has been proposed an arrangement in which the hinge unit can be attached to and removed from the image pickup apparatus body or the display panel. In the case of such an arrangement, signal communication between the display panel and the image pickup apparatus body is generally realized by connecting a signal cable drawn out of the display panel to the image pickup apparatus body. For example, according to the arrangement disclosed in Japanese Laid-Open Patent Publication (Kokai) No. 2016-51001, the cable is drawn out from a side of the display panel, and is connected to the image pickup apparatus body.

However, in Japanese Laid-Open Patent Publication (Kokai) No. 2004-226999, an accessory fastened to the accessory attachment portion with the fastening means, such as a screw, and the accessory attachment portion have respective portions brought into flat-surface contact with each other, and hence a sufficient frictional force cannot be obtained from the portions in flat-surface contact. For this reason, if a force in a rotational direction is applied to the accessory, the fastening by the fastening means may be loosened. Particularly, if an accessory having a holding portion, such as a handle, is fastened to the accessory attachment portion, as in the case of a recent video camera for business use or the like, the fastened part may be loosened to make the accessory unstable when the video camera is carried by holding the handle and the like.

Further, according to the arrangement disclosed in Japanese Laid-Open Patent Publication (Kokai) No. 2016-51001, it is not easy to perform operations for fixing the rotational position of the display panel and releasing the fixed state, and there is a possibility that an impact applied e.g. from the front causes large damage to the hinge unit. Further, the arrangement in which the cable is drawn out perpendicularly from the side or the rear of the display panel has a problem that a large space (occupied area) is required to make the cable movable when rotating the display panel. What is more, it is troublesome to handle the cable. Further, if the cable is drawn out from the side of the display panel, the cable may interfere with an angle of view of the lens, and hence the display panel cannot be positioned above the handle, which leaves room for improvement of the user-friendliness.

Further, according to the arrangement disclosed in Japanese Patent No. 5943580, to move the display panel from beside the handle to above the handle, it is necessary to rotate the display panel using a plurality of rotating shafts of the hinge unit, and it is troublesome to perform this operation.

SUMMARY OF THE INVENTION

The present invention provides an image pickup apparatus that suppresses looseness of an accessory fastened to a fastening portion of an apparatus body, and an image pickup system including the image pickup apparatus. Further, the present invention provides an image pickup apparatus that is capable of fixing an accessory at a rotational position and releasing the accessory from the fixed state with simple operations, and an image pickup system including the image pickup apparatus. Furthermore, the present invention provides an image pickup apparatus which is reduced in area occupied by a cable when rotating an accessory and of which the cable is easy to handle, and an image pickup system including the image pickup apparatus.

In a first aspect of the present invention, there is provided an image pickup apparatus comprising an accessory that includes a pair of fastening members, and an apparatus body including two fastening portions to which the accessory is removably fastened using the pair of fastening members, wherein the accessory is provided with a second fitting portion which is fitted to a first fitting portion formed around at least one of the two fastening portions, by protrusion-recess fitting, in a state in which the accessory is fastened to the two fastening portions of the apparatus body using the pair of fastening members, and wherein one of the first fitting portion and the second fitting portion comprises two fitting portions provided in association with the pair of fastening members, and the other comprises at least one fitting portion.

In a second aspect of the present invention, there is provided an image pickup apparatus including a main body, and an accessory that can be attached to and removed from the main body, wherein the accessory and the main body each include a connection portion formed by at least one pair of screw portions and a contact portion formed around the connection portion, the contact portion having a surface formed into a plurality of triangular wave shapes, and the triangular wave shapes of the contact portion of the accessory and the triangular wave shapes of the contact portion of the main body are fitted to each other in a state in which the accessory and the main body are brought into contact with each other.

In a third aspect of the present invention, there is provided an image pickup system comprising a main body unit of an image pickup apparatus, a first engagement portion provided on the main body unit or a part fixed to the main body unit, and a rotating body that includes a second engagement portion associated with the first engagement portion, and is connected to the main body unit such that the rotating body is rotatable about at least a first rotational axis and a second rotational axis substantially perpendicular to the first rotational axis, wherein the rotating body can be positioned in a first rotational position, a second rotational position, and a third rotational position, as a rotational position about the second rotational axis, in a state in which the rotating body is in a predetermined rotational position about the first rotational axis, wherein when the rotating body is rotated from the first rotational position toward the third rotational position while remaining in the predetermined rotational position about the first rotational axis, the second engagement portion is brought into contact with the first engagement portion in the middle of rotation, whereby the rotating body is restricted from rotating toward the third rotational position, and is positioned in the second rotational position, and wherein when the rotating body is in the second rotational position, by changing the rotational position about the first rotational axis from the predetermined rotational position, it is possible to release the engagement between the first engagement portion and the second engagement portion, and thereby shift the rotating body to the third rotational position.

In a fourth aspect of the present invention, there is provided an image pickup system further comprising a main body unit of an image pickup apparatus, an accessory that includes a front surface and a rear surface, a hinge unit that includes at least a first rotational axis, and is capable of rotatably connecting the main body unit and the accessory at least about the first rotational axis, and a cable having flexibility and capable of electrically connecting the main body unit and the accessory, wherein the accessory includes a coupling portion formed at a first end thereof, for coupling the hinge unit thereto, and includes a connection portion formed at a location close to a second end opposite to the first end, for connecting the cable thereto, and wherein the cable connected to the connection portion is disposed such that the cable extends along the rear surface of the accessory in a direction toward the coupling portion.

According to the present invention, it is possible to provide an image pickup apparatus that suppresses looseness of an accessory fastened to the fastening portion of the apparatus body, and an image pickup system including the image pickup apparatus.

Further, it is possible to fix an accessory at a rotational position, and release the accessory from the fixed state with simple operations.

Furthermore, it is possible to reduce an area occupied by the cable when rotating an accessory, and make it easy to handle the cable.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
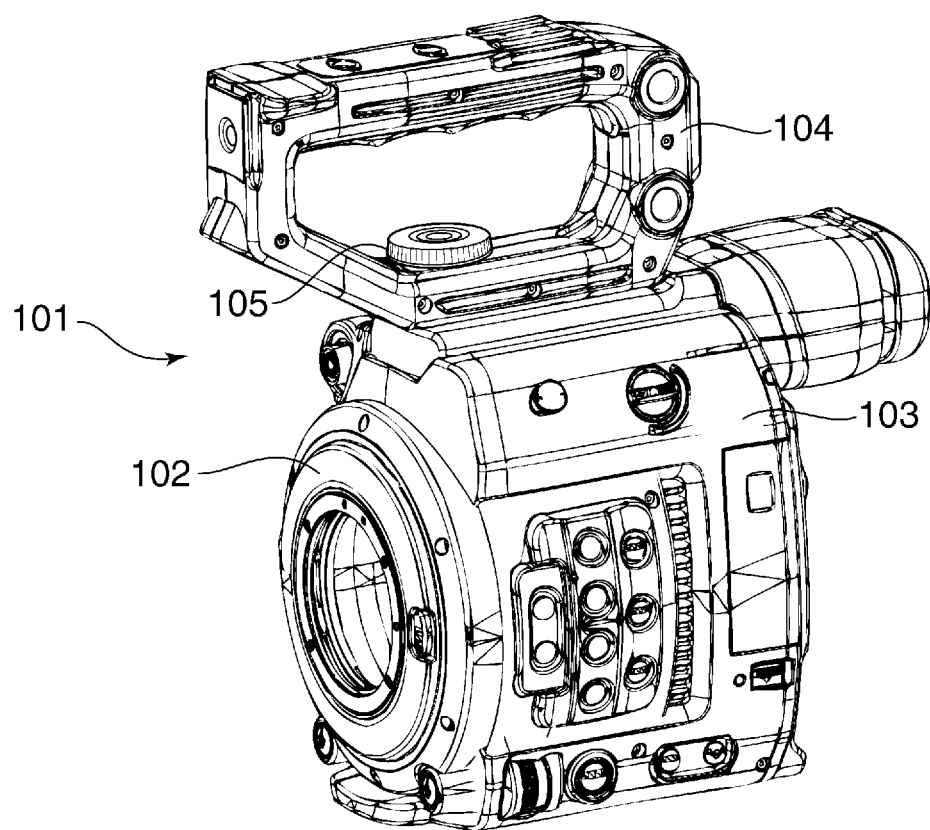
FIG. 1 is a perspective view of a digital video camera for business use as an image pickup apparatus according to a first embodiment of the present invention, as viewed from the front.

FIG. 1 is a perspective view of a digital video camera for business use as an image pickup apparatus according to a first embodiment of the present invention, as viewed from the front.

As shown in FIG. 1, the digital video camera, denoted by reference numeral 101, according to the present embodiment is provided with a mount part 102 on a front side of a camera body 103, on which a lens unit, not shown, is interchangeably mounted. On the top of the camera body 103, a handle part 104 having a holding portion held by a user is removably fastened with a first screw member 105 and the like. Here, the handle part 104 corresponds to an example of an accessory of the present invention, and the camera body 103 corresponds to an example of an apparatus body of the present invention.

Figure 2A:
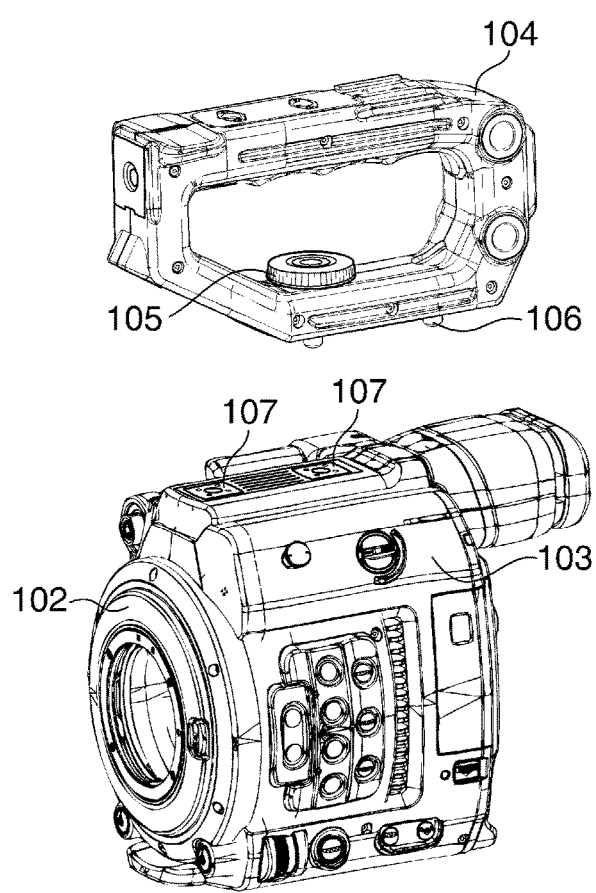
FIG. 2A is a schematic perspective view of the digital video camera shown in FIG. 1, in a state in which a handle part is separated from a camera body.
Figure 2B:
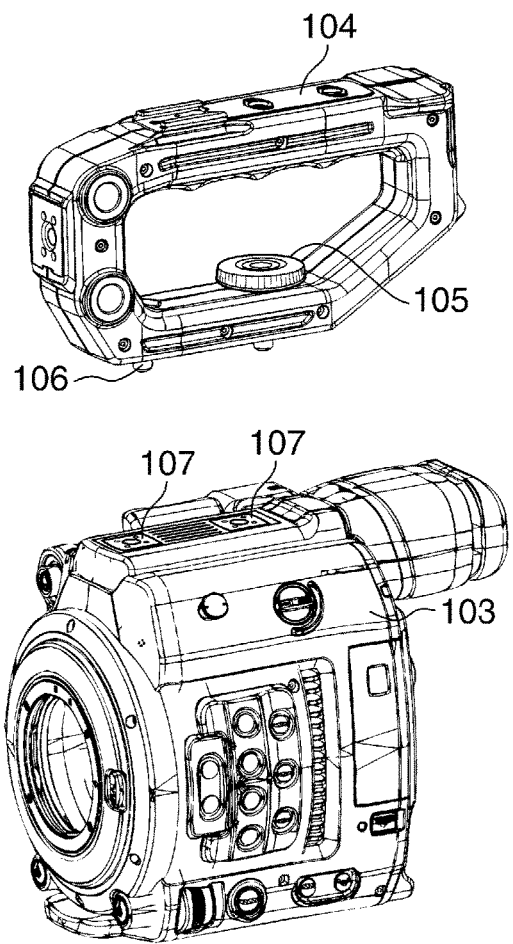
FIG. 2B is a perspective view of the digital video camera in a state in which the handle part appearing in FIG. 2A is set in an opposite direction.

FIG. 2A is a schematic perspective view of the digital video camera 101 shown in FIG. 1, in a state in which the handle part 104 is separated from the camera body 103. FIG. 2B is a perspective view of the digital video camera 101 in a state in which the handle part 104 appearing in FIG. 2A is set in an opposite direction.

As shown in FIGS. 2A and 2B, on the top of the camera body 103, there are provided two accessory attachment portions 107 at respective locations spaced from each other in an optical axis direction. Further, the handle part 104 includes the first screw member (bolt-shaped fastening member) 105 having an operation dial for manual rotation, and a second screw member (bolt-shaped fastening member) 106, such as a hexagon socket head bolt. The first screw member 105 and the second screw member 106 are fastened to the two accessory attachment portions 107, respectively, and are provided at respective locations spaced from each other in association with the two accessory attachment portions 107. The first screw member 105 and the second screw member 106 correspond to an example of a pair of fastening members of the present invention.

FIG. 2A shows a case where the first screw member 105 of the handle part 104 is going to be fastened to an accessory attachment portion 107 at a location close to the front side of the camera body 103 in the optical axis direction. FIG. 2B shows a case where the second screw member 106 of the handle part 104 is going to be fastened to the accessory attachment portions 107 at the location close to the front side of the camera body 103 in the optical axis direction. Note that for example, in a case where there is no tool for fastening the second screw member 106, such as a hexagon wrench, the handle part 104 can be simply fastened to the camera body 103 using only the first screw member 105.

Figure 3A:
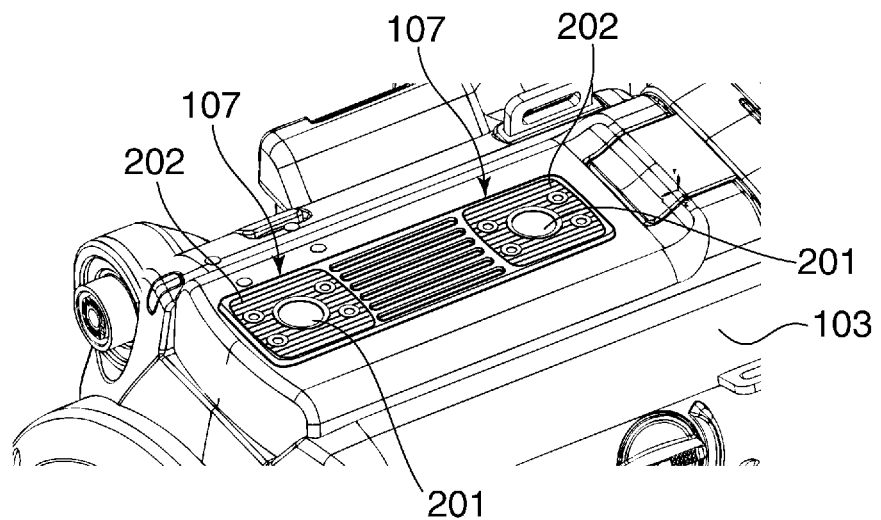
FIG. 3A is a perspective view showing an area including accessory attachment portions of the camera body.
Figure 3B:
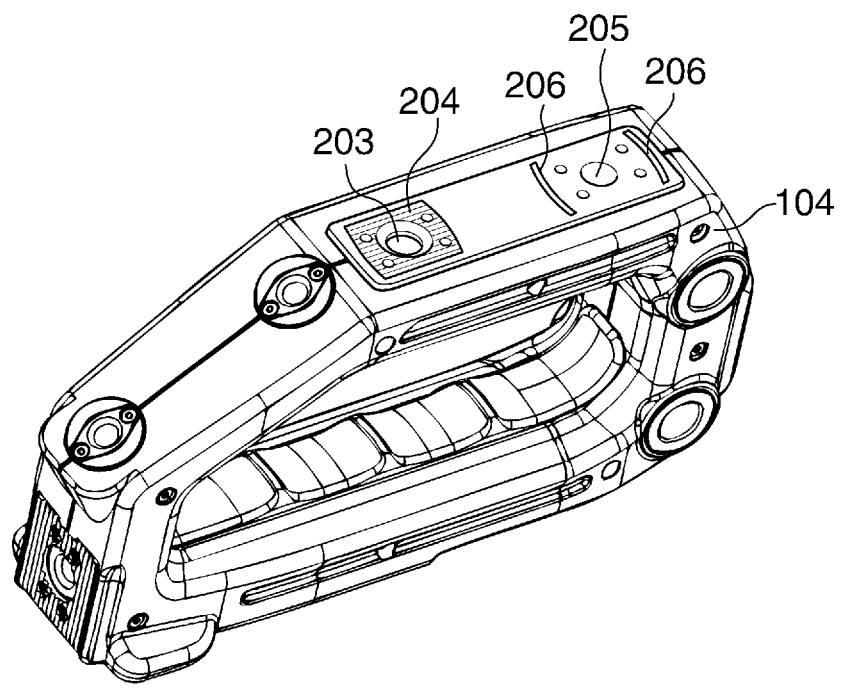
FIG. 3B is a perspective view of the handle part, as viewed from a side which is to be opposed to the accessory attachment portions of the camera body.

FIG. 3A is a perspective view showing an area including the accessory attachment portions 107 of the camera body 103, and FIG. 3B is a perspective view of the handle part 104, as viewed from a side which is to be opposed to the accessory attachment portions 107 of the camera body 103.

As shown in FIG. 3A, the two accessory attachment portions 107 of the camera body 103 are each formed with a screw hole 201 and a first fitting portion (contact portion) 202 in the form of protrusions and recesses formed around the screw hole 201. The two screw holes 201 each have an inner peripheral portion formed with a female screw portion having a size of e.g. M6, which is associated with a male screw portion of each of respective screw shafts of the first screw member 105 and the second screw member 106. The first screw member 105 and the second screw member 106 are screwed into and fastened to the two screw holes 201 of the camera body 103, respectively, whereby the handle part 104 is fastened to the camera body 103. The screw holes 201 correspond to an example of a fastening portion of the present invention.

Each first fitting portion 202 is comprised of a plurality of protruding strips, each extending in the optical axis direction, which are juxtaposed at a pitch of e.g. 0.5 to 1.5 mm in the direction of the width of the accessory attachment portion 107, which is perpendicular to the optical axis. The plurality of protruding strips of the first fitting portion 202 each have an isosceles right triangular shape, in cross-section, which has a vertex with an angle of approximately 90°, and a recessed strip having the same shape, in cross-section, as that of each protruding strip, is formed between each adjacent ones of the plurality of protruding strips. Thus, the surface of the first fitting portion (contact portion) 202 is formed into a plurality of triangular wave shapes. The triangular wave shapes form a shape symmetrical with respect to the screw hole 201

As shown in FIG. 3B, a surface of the handle part 104, which is opposed to the accessory attachment portions 107 of the camera body 103, is formed with a first screw insertion hole 203 in which the screw shaft of the first screw member 105 is inserted, and a second screw insertion hole 205 in which the screw shaft of the second screw member 106 is inserted. A second fitting portion (contact portion) 204 in the form of protrusions and recesses having the same arrangement as that of the first fitting portion 202 of the camera body 103 is formed around the first screw insertion hole 203. When the handle part 104 is fastened to the camera body 103 by fastening the first screw member 105 and the second screw member 106, the protruding strips and the recessed strips of the second fitting portion 204 of the handle part 104 are fitted to the recessed strips and the protruding strips of the first fitting portion 202 of the camera body 103, respectively. The method of fitting performed as described above is referred to as "protrusion-recess fitting".

Receiving ribs 206 are formed at respective locations on front and rear sides of the second screw insertion hole 205 as viewed in a direction connecting the second screw insertion hole 205 and the first screw insertion hole 203. The receiving ribs 206 are formed so as to prevent the handle part 104 from being brought into contact with the protruding strips of the first fitting portion 202 of the camera body 103 and thereby being damaged, when the handle part 104 is fastened to the camera body 103.

If a mounting error occurs at the two first fitting portions 202 of the camera body 103 in the optical axis direction, there is a possibility that the parallel condition between the two first fitting portions 202 is not maintained. In this case, assuming that the second fitting portion 204 has been provided at each of two locations on the handle part 104, there occurs a problem that one of the second fitting portions 204 is not fitted with the associated first fitting portion 202 of the camera body 103 by protrusion-recess fitting, but remains unfitted therein.

To prevent this, the handle part 104 is provided with the second fitting portion 204 in the form of protrusions and recesses only around the first screw insertion hole 203, and the receiving ribs 206 are formed around the second screw insertion hole 205 at the respective locations avoiding the first fitting portion 202 of the camera body 103. The receiving ribs 206 are arranged at the two locations on the front and rear sides of the second screw insertion hole 205 as viewed in the direction connecting the second screw insertion hole 205 and the first screw insertion hole 203, respectively, such that the receiving ribs are brought into contact with the top surface of the camera body 103 at the locations avoiding the first fitting portion 202 of the camera body 103.

The receiving ribs 206 are provided such that a position where the receiving ribs 206 are in contact with the top surface of the camera body 103 is at substantially the same level in the direction of the height of the camera body 103 as a position where the second fitting portion 204 and the first fitting portion 202 of the camera body 103 are fitted with each other by protrusion-recess fitting.

When the first fitting portion 202 of the camera body 103 and the second fitting portion 204 of the handle part 104 are brought into contact with each other by protrusion-recess fitting, it is possible to obtain a larger frictional force than that conventionally obtained by contact between flat surfaces. Therefore, even when a force is applied to the handle part 104 in a rotational direction in which the fastening by the screw members 105 and 106 is loosened, it is possible to suppress loosening the fastening by the screw members 105 and 106.

Particularly, as mentioned above, it is possible to simply fasten the handle part 104 to the camera body 103 only with the first screw member 105. In this case, the frictional force generated only by the fastening force applied by manually rotating the operation dial of the first screw member 105 is small assuming that the flat surfaces are brought into contact, and when a force in the rotational direction is applied to the handle part 104, the fastening by the first screw member 105 is liable to be loosened.

In contrast, the contact between the first fitting portion 202 of the camera body 103 and the second fitting portion 204 of the handle part 104 by protrusion-recess fitting, in the case of the present embodiment, makes it possible to obtain a large frictional force by a small fastening force applied by manually rotating the operation dial of the first screw member 105. Therefore, even when a force is applied to the handle part 104 in the rotational direction in which the fastening by the first screw member 105 is loosened, it is possible to suppress loosening of the fastening by the first screw member 105.

Figure 4A:
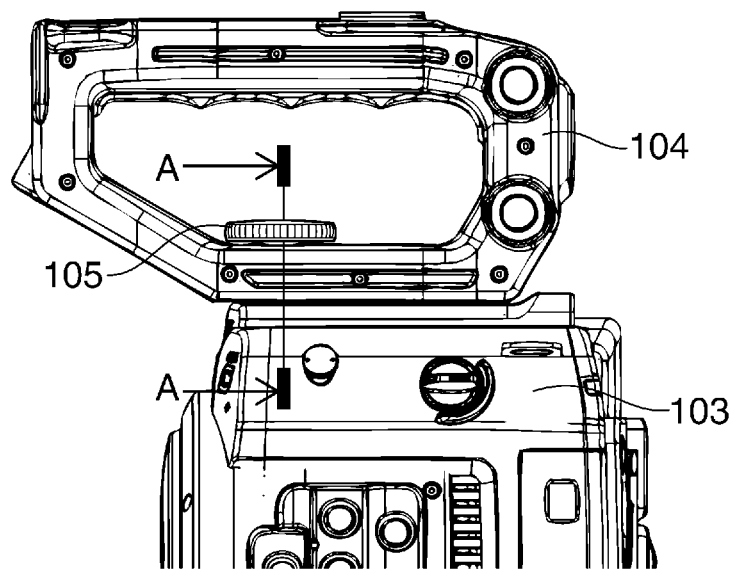
FIG. 4A is a partial side view of a right side, as viewed from the front, of the digital video camera.
Figure 4B:
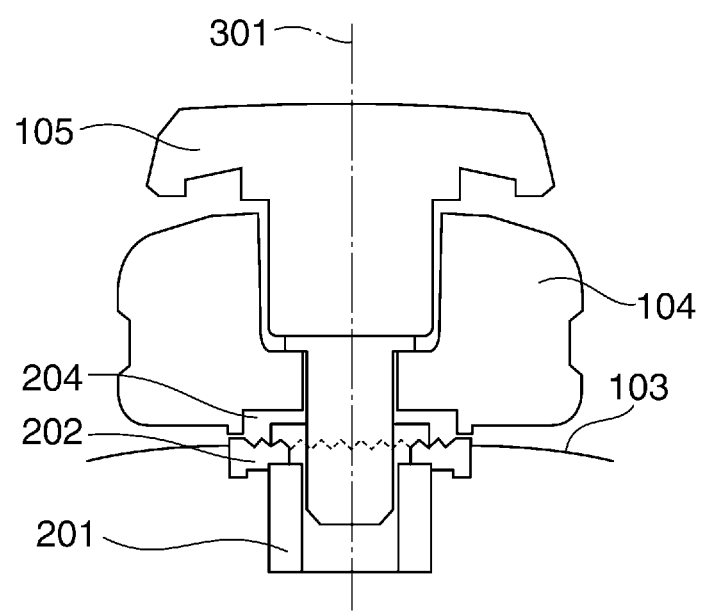
FIG. 4B is an enlarged schematic cross-sectional view taken along A-A in FIG. 4A.

FIG. 4A is a partial side view of a right side, as viewed from the front, of the digital video camera, and FIG. 4B is an enlarged schematic cross-sectional view taken along A-A in FIG. 4A.

As shown in FIG. 4B, in a state in which the handle part 104 is fastened to the camera body 103, the vertex portion of a recessed strip of the first fitting portion 202 and the vertex portion of an associated protruding strip of the second fitting portion 204 are positioned in phase with a centerline 301 of the first screw member 105. This makes it possible to fit the first fitting portion 202 and the second fitting portion 204 by protrusion-recess fitting, even when the handle part 104 is rotated through 180° with respect to the camera body 103, and is attached and fastened thereto in the opposite direction by the first screw member 105, as shown in FIG. 2B.

As described above, in the present embodiment, it is possible to suppress loosening of the handle part 104 fastened to the accessory attachment portions 107 of the camera body 103, which makes it possible to stably carry the video camera by holding the handle part 104.

Note that although in the present embodiment, the handle part 104 is fastened to the camera body 103 by bringing the fitting portions 202 and 204 each having juxtaposed thereon the plurality of protruding strips with the isosceles right triangular shape, in cross-section, into contact with each other by protrusion-recess fitting, this is not limitative. That is, the protrusion-recess fitting structure of the contact portions may be replaced by any other fitting structure insofar as it is possible to obtain a large frictional force by a small fastening force.

Further, although in the present embodiment, the receiving ribs 206 are formed at the respective locations around the second screw insertion hole 205 of the handle part 104, which avoid the first fitting portion 202 of the camera body 103, this is not limitative. For example, the second fitting portion 204 may be formed around each of the first screw insertion hole 203 and the second screw insertion hole 205 of the handle part 104, and one first fitting portion 202 and the receiving ribs 206 may be formed on the camera body 103.

Figure 5:
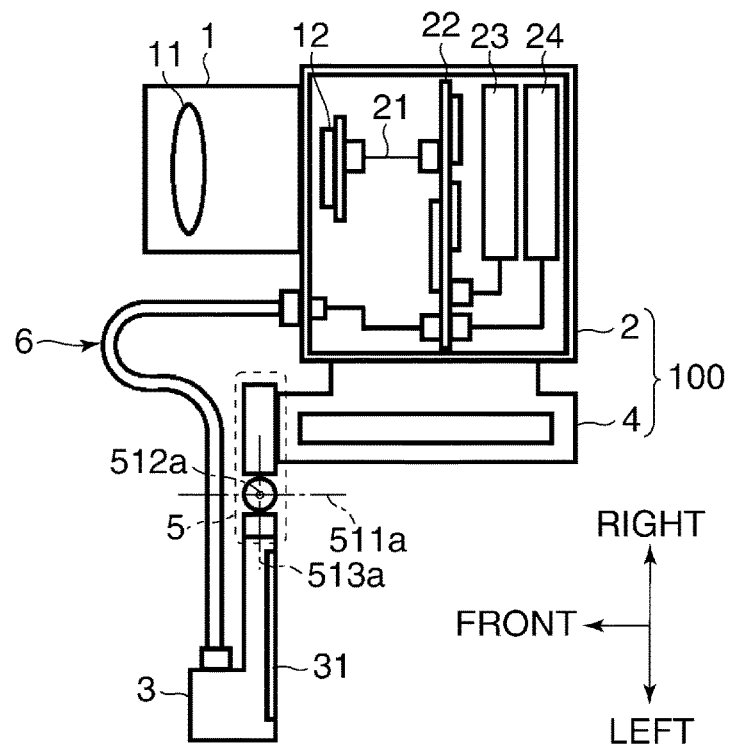
FIG. 5 is a schematic top view of an image pickup system according to a second embodiment.

Next, a description will be given of a second embodiment of the present invention. FIG. 5 is a schematic top view of an image pickup system according to the second embodiment. This image pickup system includes a main body unit 100, a lens barrel 1, and an accessory group. The main body unit 100 is comprised of an image pickup apparatus body 2 (hereinafter abbreviatedly referred to as the apparatus body 2), and a handle 4. The handle 4 can be attached to and removed from the apparatus body 2. The accessory group includes a display panel unit 3 (hereinafter abbreviatedly referred to as the display panel 3) that displays an image, a hinge unit 5, and a signal cable 6. Hereinafter, right and left directions, and upward and downward directions of the image pickup system refer to directions as viewed from a photographer at the time of photographing (see FIGS. 5 and 8A).

Figure 6:
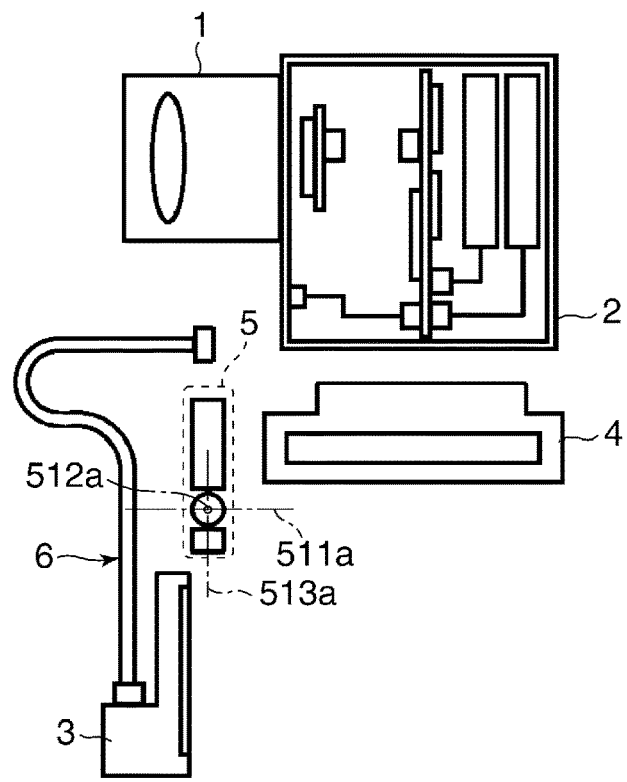
FIG. 6 is a schematic exploded top view of the image pickup system, in a state in which an accessory group is removed.
Figure 7:
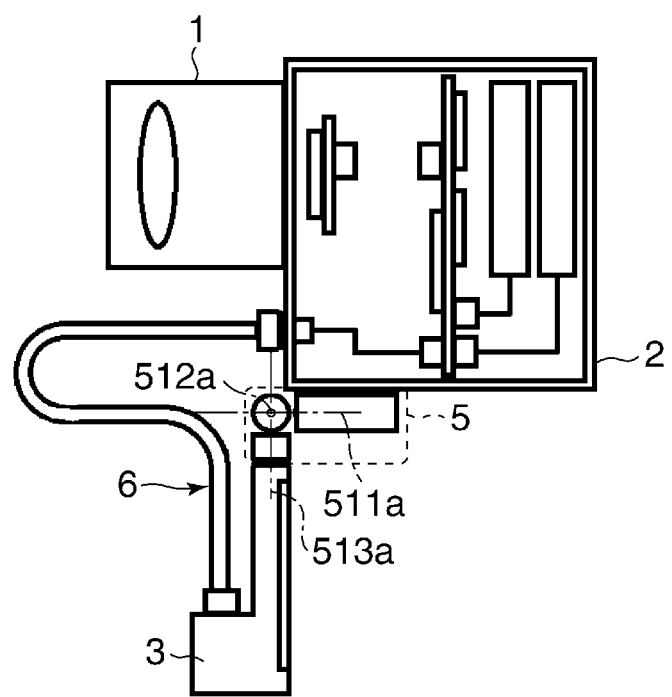
FIG. 7 is a schematic top view of the image pickup system, in a state in which a handle is removed and the accessory group is attached.

FIG. 6 is a schematic exploded top view of the image pickup system in a state in which the accessory group is removed from the main body unit 100. The handle 4 is not necessarily required to be included in the main body unit 100. Therefore, the hinge unit 5 may be connectable to the apparatus body 2. FIG. 7 is a schematic top view of the image pickup system in a state in which the handle 4 is removed and the accessory group is attached to the apparatus body 2.

The lens barrel 1 can be mounted on and removed from the apparatus body 2, and includes a lens 11. In the apparatus body 2, an image pickup device 12 converts optical information of an optical image formed via the lens 11 into electric signals, and transfers the electric signals to a circuit board 22 via a flexible circuit board 21. The circuit board 22 sends the electric signals received from the image pickup device 12 to the display panel 3 to display through images, and sends the electric signals to a recording section 23 to record the same. A power supply section 24 supplies electric power for performing the above-mentioned processing. A photographer (user) can hold the handle 4, to thereby support the main body unit 100 when performing photographing and carry the main body unit 100 when not performing photographing. The hinge unit 5 can rotatably connect the display panel 3 to the main body unit 100. The hinge unit 5 has three degrees of freedom based on three rotational axes (rotational axis 511a: first rotational axis), (rotational axis 512a: second rotational axis), and (rotational axis 513a: third rotational axis), and can change the posture (position and orientation) of the display panel 3. The hinge unit 5 can be attached to and removed from the handle 4 and the display panel 3 e.g. by a known screw fastening method. The signal cable 6 can be connected to and removed from the display panel 3 and the apparatus body 2, and can electrically connect the two. When the display panel 3 and the apparatus body 2 are connected by the signal cable 6, signal communication and supply of power between the two are enabled. Note that the apparatus body 2 and the accessory group may be electrically connected by wiring passed through the hinge unit 5.

Figure 8A:
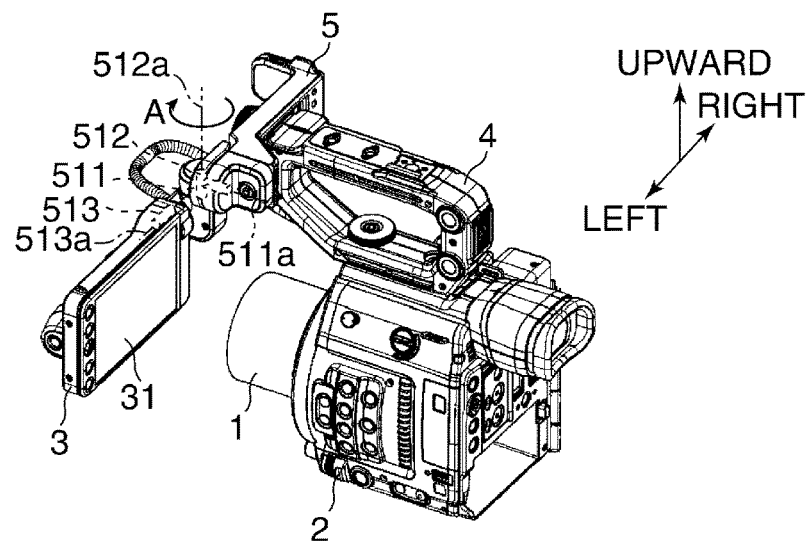
FIG. 8A is a perspective view of the image pickup system in a state in which a display panel is set to a second position.
Figure 8B:
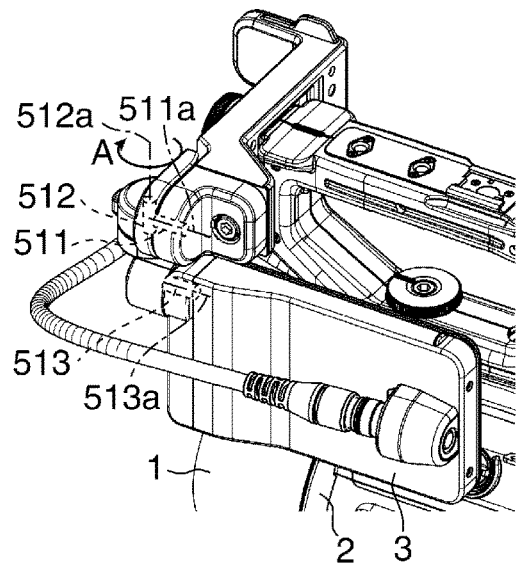
FIG. 8B is a perspective view of the image pickup system in a state in which the display panel is set to a first position.
Figure 8C:
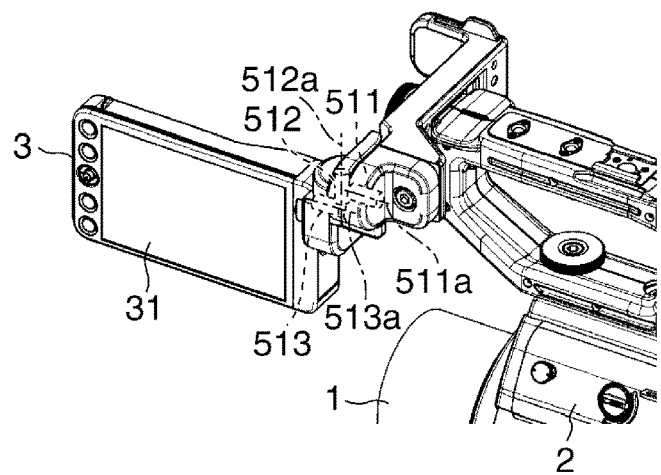
FIG. 8C is a perspective view of the image pickup system in state in which the display panel is set to a third position.

FIGS. 8A, 8B, and 8C are perspective views of the image pickup system as viewed when the display panel 3 is set to a second position, a first position, and a third position, respectively. These first to third positions (first to third rotational positions) are representative positions, and the rotational position of the display panel 3 about the rotational axis 512a is different in each position. A display section 31 of the display panel 3 has a touch panel function, and the photographer can perform operations, such as a shooting operation and a setting changing operation, by touching the touch panel with his/her finger. First, the second position (see FIG. 8A) is a position for photographing, in which the display panel 3 is positioned beside (on the left side of) the handle 4 of the main body unit 100, and the display section 31 of the display panel 3 is opposed to the photographer. The first position (see FIG. 8B) is an accommodated position in which the display section 31 is positioned beside (on the left side of) the handle 4, and is opposed to the handle 4. The third position (see FIG. 8C) is a position for photographing, in which the display section 31 is oriented to the left, as viewed from the photographer, which is suitable for checking the settings of the apparatus, an angle of view, and so forth, by a user other than the photographer, who is viewing the display section 31.

Figure 9A:
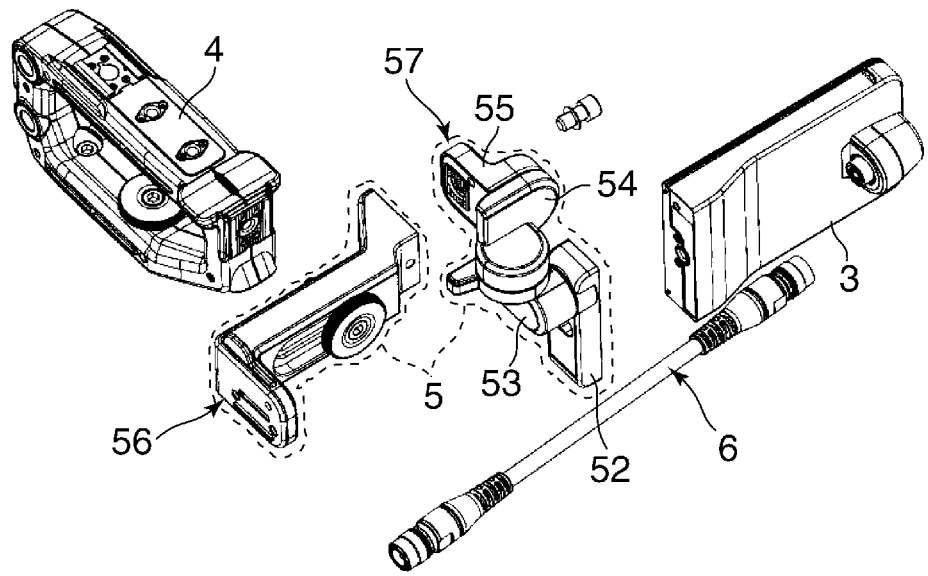
FIG. 9A is an exploded perspective view of the accessory group.
Figure 9B:
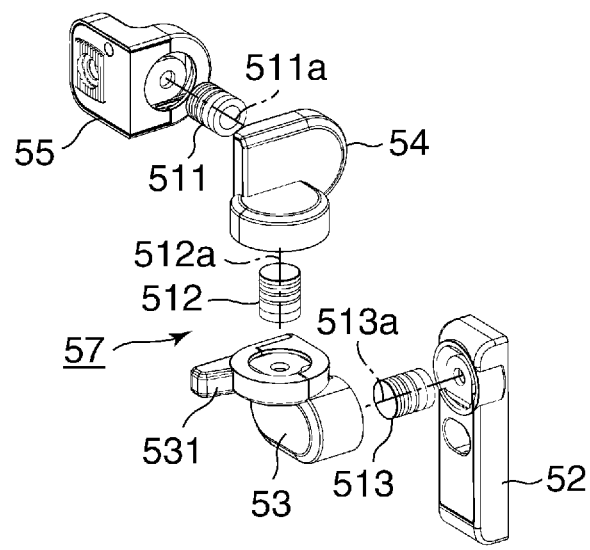
FIG. 9B is an exploded perspective view of a hinge sub unit.

FIGS. 9A and 9B are exploded perspective views of the accessory group and a hinge sub unit 57, respectively. In FIG. 9A, the handle 4 is also illustrated for convenience of explanation. The hinge unit 5 can be separated from and connected to the handle 4 by a known screw fastening method. The hinge unit 5 is comprised of a base unit 56 and the hinge sub unit 57, which are connected by a known screw fastening method (see FIG. 9A). The hinge sub unit 57 includes not only rotating shaft members 511, 512, and 513, each have a fixed resistive torque, but also arm portions 52, 53, 54, and 55. The centers of rotation of the rotating shaft members 511, 512, and 513 correspond to the rotational axes 511a, 512a, and 513a, respectively. The arm portion 54 can be rotated about the rotational axis 511a with respect to the arm portion 55. The arm portion 53 can be rotated about the rotational axis 512a with respect to the arm portion 54. The arm portion 52 can be rotated about the rotational axis 513a with respect to the arm portion 53. The arm portion 53 includes a protruding portion 531 (second engagement portion).

The arm portion 52 can be attached to and removed from the display panel 3. The base unit 56 and the arm portion 55 form a first member which can be attached to and removed from the main body unit 100. The arm portion 54 forms a second member which is rotatable about the rotational axis 511a with respect to the arm portion 55 via the rotating shaft member 511. The arm portion 53 forms a third member which is rotatable about the rotational axis 512a with respect to the arm portion 54 (second member) via the rotating shaft member 512. In a state of the apparatus body 2 in which the accessory group is attached thereto, the rotational axis 511a is substantially parallel to the optical axis of the lens 11, and the rotational axis 513a is substantially parallel to the longitudinal direction of the display panel 3. The rotational axis 512a is always substantially perpendicular to both of the rotational axis 511a and the rotational axis 513a. The user can shift the display panel 3 from the first position, shown in FIG. 8B, to the second position by rotating the display panel 3 about the rotational axis 512a in a direction indicated by an arrow A (clockwise direction, as viewed from above).

Figure 10A:
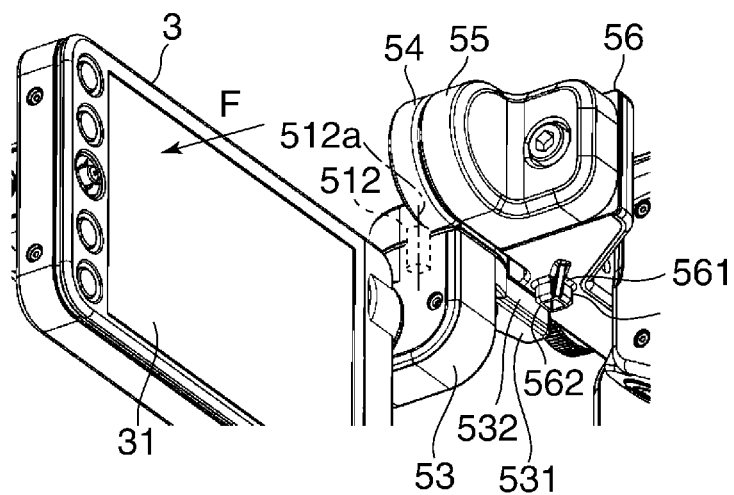
FIG. 10A is a perspective view of a hinge unit and a display panel, as viewed from the bottom when the display panel is in the second position.
Figure 10B:
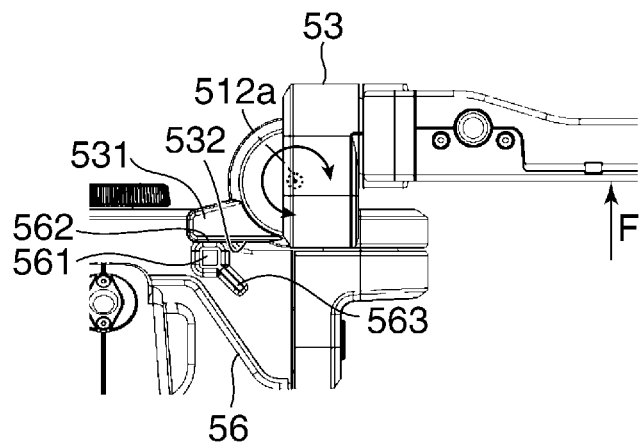
FIG. 10B is a bottom view of the hinge unit and the display panel, as viewed from the bottom when the display panel is in the second position.

FIG. 10A is a perspective view of the hinge unit 5 and the display panel 3, as viewed from the bottom when the display panel 3 is in the second position. FIG. 10B is a bottom view of the hinge unit 5 and the display panel 3 as viewed when the display panel 3 is in the second position.

Incidentally, as far as rotational operations about the rotational axis 511a and the rotational axis 512a are concerned, the display panel 3 and the arm portion 52 can form a "rotating body" which is rotated as an integral unit about the rotational axis 511a and the rotational axis 512a. Note that when a rotational operation of the display panel 3 is performed about the rotational axis 512a from the first position to the second position, the arm portion 53 is also rotated in unison with the above-mentioned rotating body. The rotational position about the rotational axis 511a is common between all of the first, second, and third positions, and is referred to as the "predetermined rotational position". The predetermined rotational position is a rotational position at which the axial direction of the rotational axis 512a is parallel to the vertical direction.

Figure 11:
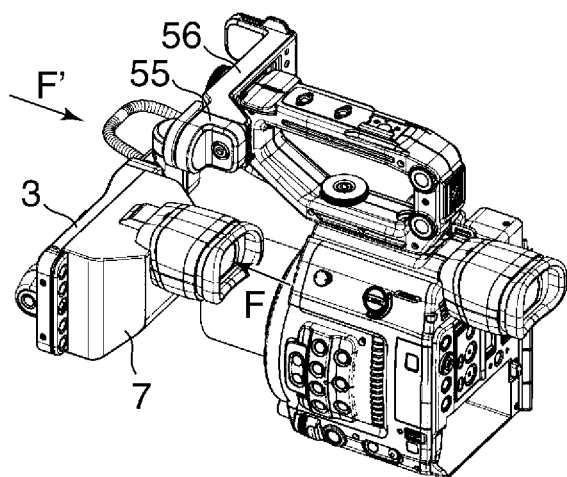
FIG. 11 is a perspective view of the image pickup system in a state in which an external finder is attached to the display panel.

A lower surface of the base unit 56 is provided with a protruding portion 561 (first engagement portion) associated with the protruding portion 531. In the second position, a contact surface 532 of the protruding portion 531 is opposed to and brought into contact with a contact surface 562 of the protruding portion 561. That is, the protruding portion 531 is brought into contact with the protruding portion 561, in the middle of rotation of the rotating body including the display panel 3 from the first position of the display panel 3 to the third position of the same in a state in which the rotating body including the display panel 3 is in the predetermined rotational position about the rotational axis 511a. With this, the rotating body is restricted from rotation toward the third position, and is also positioned in the second position. The protruding portion 531 functions as a rotation stopper, and even when a load F is applied from the photographer to the display panel 3 in the second position, the arm portion 53 is prevented from being easily rotated. The load F is a load generated e.g. by a touch operation on the display section 31, or a load generated when the face is pressed against an external finder 7 attached to the display panel 3. A state of the display panel 3 having the external finder 7 attached thereto is shown in FIG. 11.

Figure 12A:
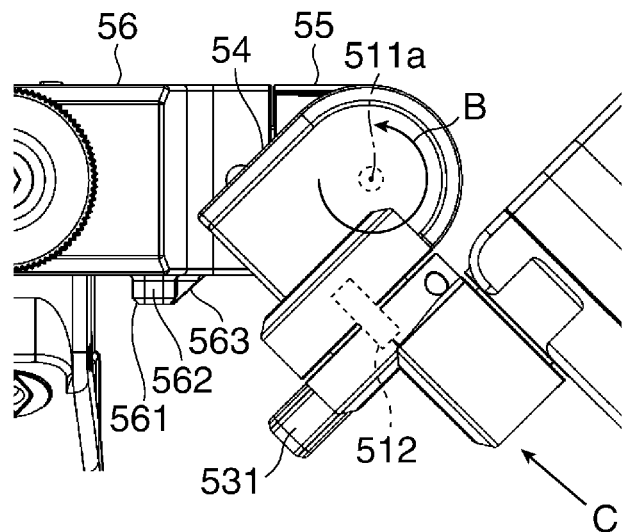
FIG. 12A is a partial view of an arm portion and components therearound, as viewed from an object side when the display panel is rotated through approximately 45° from the second position.
Figure 12B:
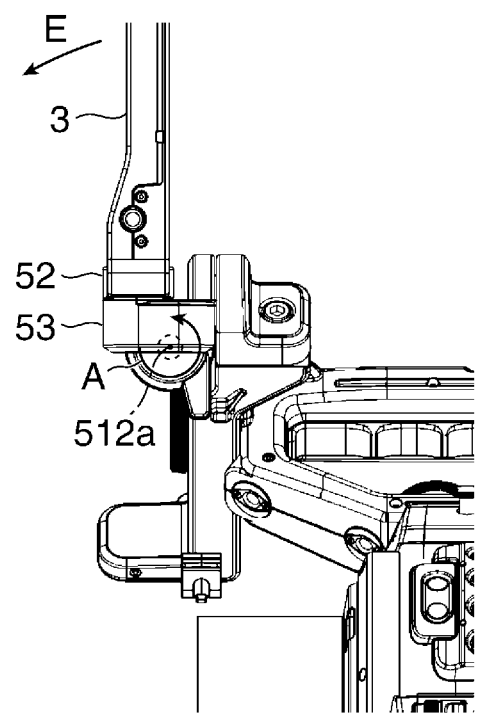
FIG. 12B is a partial view of a rotating shaft member and components therearound appearing in FIG. 12A, as viewed from a direction indicated by an arrow C in FIG. 12A.
Figure 13:
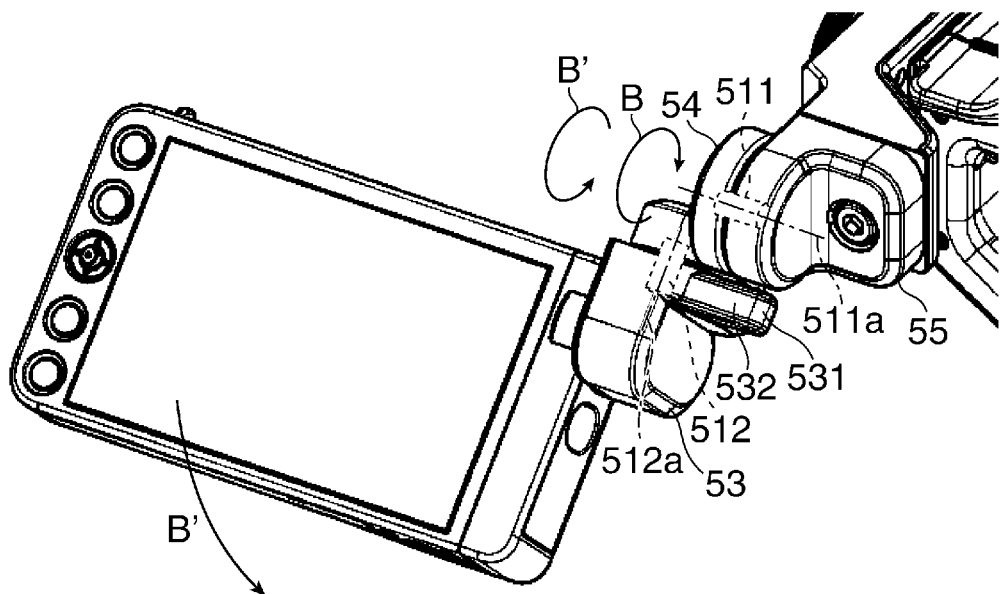
FIG. 13 is a perspective view of the hinge unit and the display panel in a state in which the display panel is in the middle of shifting from the second position to the third position.

To shift the display panel 3 from the second position to the third position, it is necessary to release the engagement between the contact surface 532 of the protruding portion 531 and the contact surface 562 of the protruding portion 561. FIG. 12A is a view of the arm portion 54 in a state rotated through approximately 45° from the second position in a direction indicated by an arrow B, and components therearound, as viewed from the object side (from a direction indicated by an arrow F' in FIG. 11). FIG. 12B is a partial view of the rotating shaft member 512 and components therearound appearing in FIG. 12A, as viewed from a direction indicated by an arrow C in FIG. 12A. As shown in FIG. 12A, the user rotates the arm portion 54 about the rotational axis 511a in the direction B (anticlockwise direction, as viewed from the object, in which the position of a free end of the display panel 3 is displaced upward). This causes the engagement between the protruding portion 531 and the protruding portion 561 to be released, whereby the arm portion 53 is enabled to be rotated about the rotational axis 512a. Then, as shown in FIG. 12B, when the user rotates the arm portion 53 about the rotational axis 512a in a direction indicated by an arrow A (direction toward the third position with respect to the rotation about the rotational axis 512a), the display panel 3 is rotated together with the arm portion 53 in a direction indicated by an arrow E, and is shifted to the position shown in FIG. 13. After rotating the arm portion 53 to the position shown in FIG. 13, the user rotates the arm portion 54 about the rotational axis 511a in a direction B', opposite to a direction B in FIG. 13, whereby it is possible to shift the display panel 3 to the third position (see FIG. 8C). That is, when the display panel 3 is in the second position, the rotational position about the rotational axis 511a is once changed from the predetermined rotational position in the direction B, whereby it is possible to release the engagement between the protruding portion 531 and the protruding portion 561, and shift the display panel 3 to the third position. This makes it possible to fix the display panel 3 in the second position, and release the display panel 3 from the fixed state with simple operations.

Figure 14:
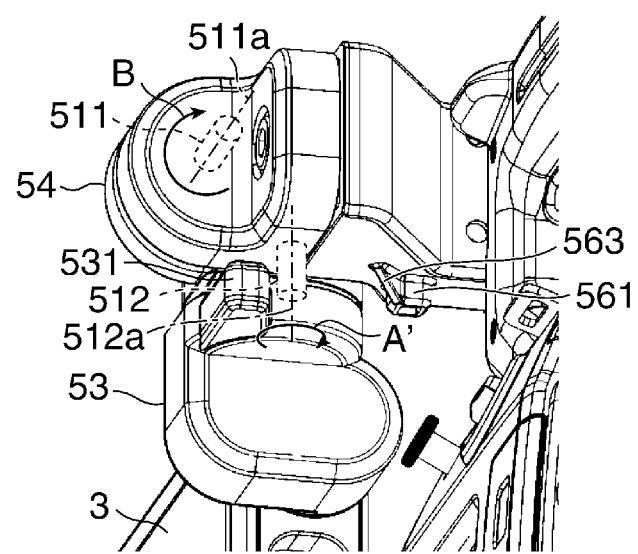
FIG. 14 is a perspective view of the hinge unit and the display panel, as viewed from the bottom when the display panel is in the third position.

FIG. 14 is a partial perspective view of the hinge unit 5 and the display panel 3, as viewed from the bottom when the display panel 3 is in the third position. The protruding portion 561 is formed with a slope 563 forming a tapered surface which gradually changes in protruding height toward the lower surface. The slope 563 is formed on an opposite side to the contact surface 562 with respect to the rotational axis 512a. That is, the slope 563 is formed on the protruding portion 561 on a side opposite to a side which is brought into contact with the protruding portion 531 when the display panel 3 is rotated, while remaining in the predetermined rotational position, from the first position to the third position.

When the user rotates the arm portion 53 about the rotational axis 512a in a direction indicated by an arrow A' opposite to the direction A, the arm portion 54 is rotated about the rotational axis 511a in the direction B in such a manner that the protruding portion 531 slides along the slope 563 until the protruding portion 531 crosses over the protruding portion 561. More specifically, in a case where the protruding portion 531 is engaged with the protruding portion 561 in the middle of rotation of the display panel 3, remaining in the predetermined rotational position, from the first position to the third position, the display panel 3 is urged by action of the slope 563 as the tapered surface. That is, the display panel 3 is urged in a direction of rotation about the rotational axis 511a, in which the engagement between the protruding portions 531 and 561 is released. This makes it possible to easily shift the display panel 3 from the third position to the second or first position without being intentionally operated by the user for rotating the arm portion 54 about the rotational axis 511a.

As described above, with the three-axis rotation mechanism, the display panel 3 can take various postures and is high in degree of freedom. Further, it is possible to stably hold the display panel 3 in the second position suitable for photographing, and easily shift the display panel 3 from the second position to the third position, or from the third position to the second position.

Figure 15:
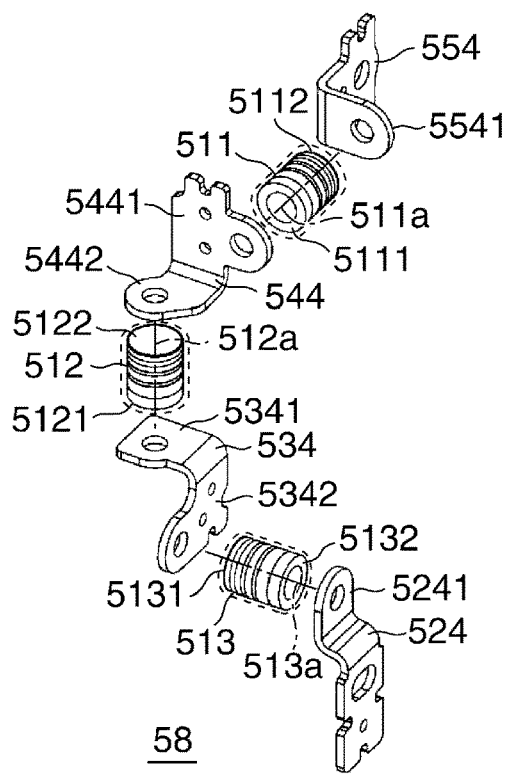
FIG. 15 is an exploded perspective view of a hinge plate unit.

Next, a description will be given of details of the hinge sub unit 57, and how to assemble the hinge sub unit 57. FIG. 15 is an exploded perspective view of a hinge plate unit 58 incorporated in the hinge sub unit 57. The hinge plate unit 58 is formed by rotatably caulking sheet metal members 524, 534, 544, and 554, with the associated rotating shaft members 513, 512, and 511. The sheet metal member 534 includes a flat portion 5341 and a flat portion 5342, and is formed into a substantially L-shape. The flat portion 5341 is perpendicular to the rotational axis 512a, and can be rotated about the rotational axis 512a on one end 5121 of the rotating shaft member 512. The flat portion 5342 is perpendicular to the rotational axis 513a, and can be rotated about the rotational axis 513a on one end 5131 of the rotating shaft member 513.

The sheet metal member 544 includes a flat portion 5441 and a flat portion 5442, and is formed into a substantially L-shape. The flat portion 5441 is perpendicular to the rotational axis 511a, and can be rotated about the rotational axis 511a on one end 5111 of the rotating shaft member 511. The flat portion 5442 is perpendicular to the rotational axis 512a, and can be rotated about the rotational axis 512a on the other end 5122 of the rotating shaft member 512. The flat portion 5341 and the flat portion 5442 are arranged in opposed substantially parallel relationship. The sheet metal member 554 includes a flat portion 5541. The flat portion 5541 is perpendicular to the rotational axis 511a, and can be rotated about the rotational axis 511a on the other end 5112 of the rotating shaft member 511. The flat portion 5541 is arranged in opposed substantially parallel relationship to the flat portion 5441. The sheet metal member 524 includes a flat portion 5241. The flat portion 5241 is perpendicular to the rotational axis 513a, and can be rotated about the rotational axis 513a on the other end 5132 of the rotating shaft member 513. The flat portion 5241 is arranged in opposed substantially parallel relationship to the flat portion 5342.

Figure 16:
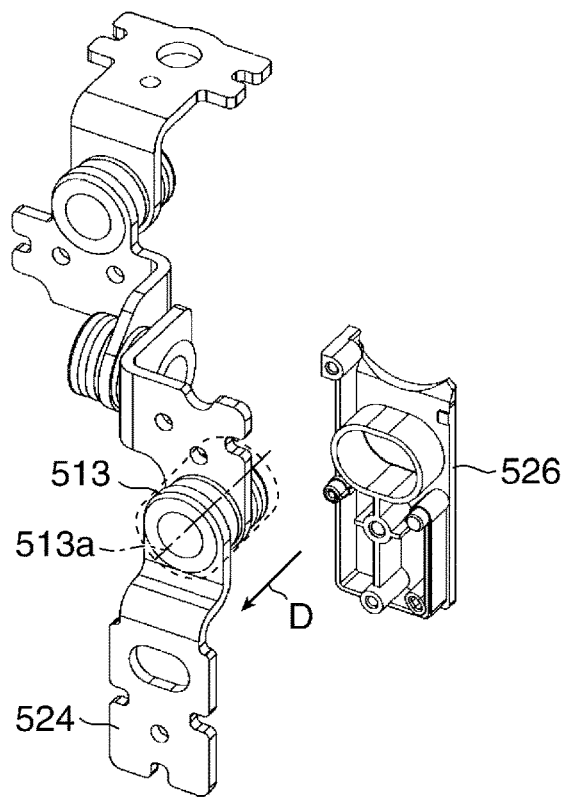
FIG. 16 is a perspective view showing how a cover is assembled to a sheet metal member.

The hinge sub unit 57 is formed by assembling a plurality of cover members to the hinge plate unit 58. Assembling of the covers will be described with reference to FIGS. 16 to 19B. FIG. 16 is a perspective view showing how a cover 526 is assembled to the sheet metal member 524. The cover 526 is assembled along an axial line of the rotational axis 513a from a direction indicated by an arrow D.

Figure 17A:
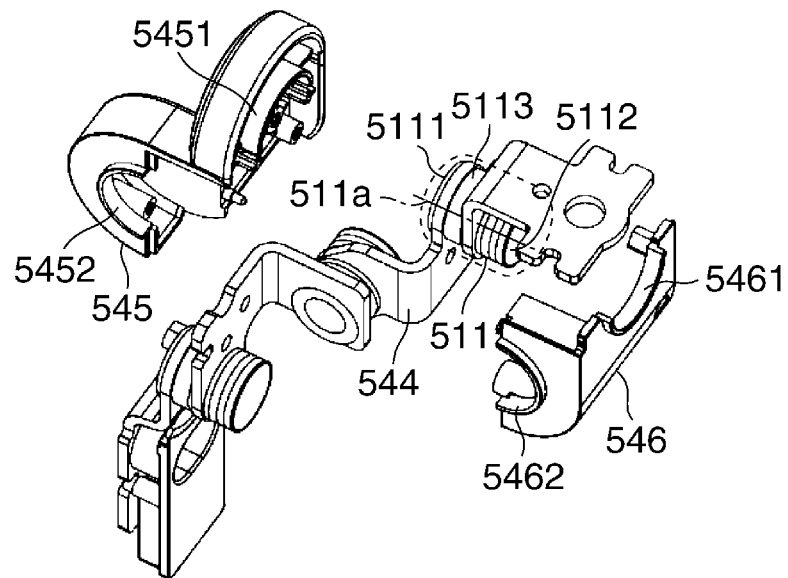
FIGS. 17A to 17C are perspective views showing how covers are assembled to the sheet metal member.
Figure 17B:
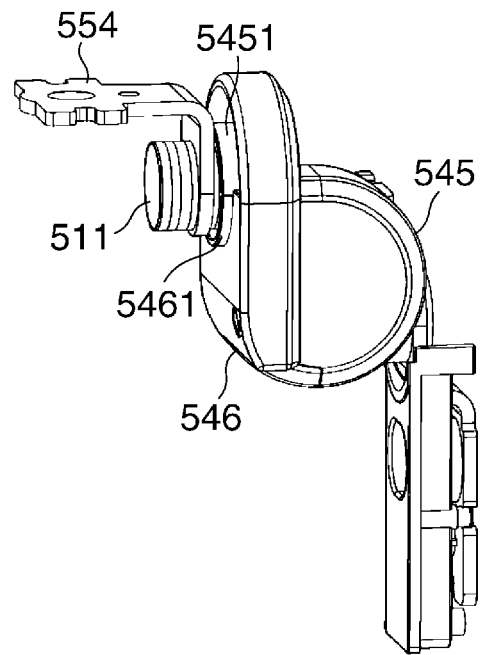
Figure 17C:
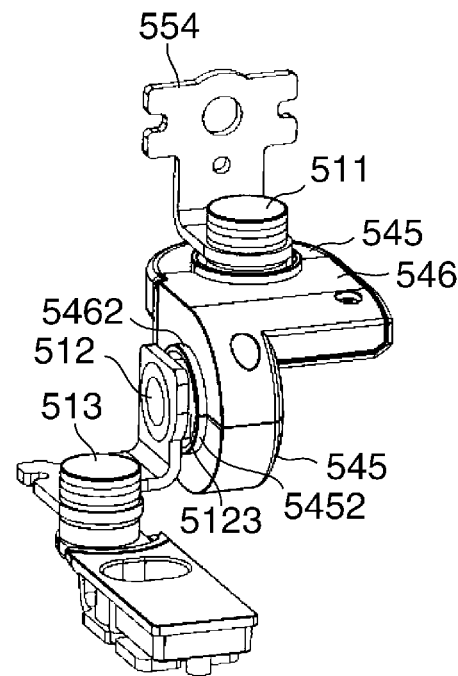
Figure 18A:
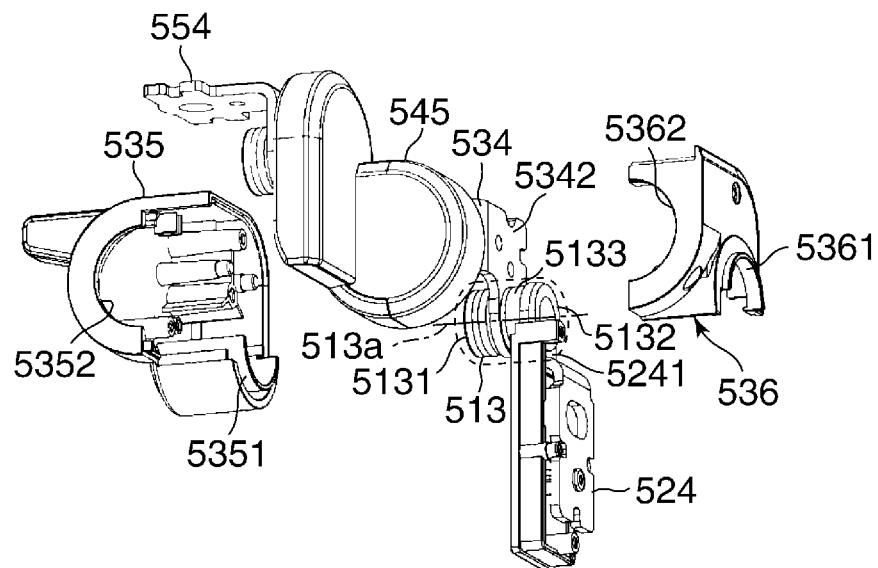
FIGS. 18A and 18B are perspective views showing how covers are assembled to a sheet metal member.
Figure 18B:
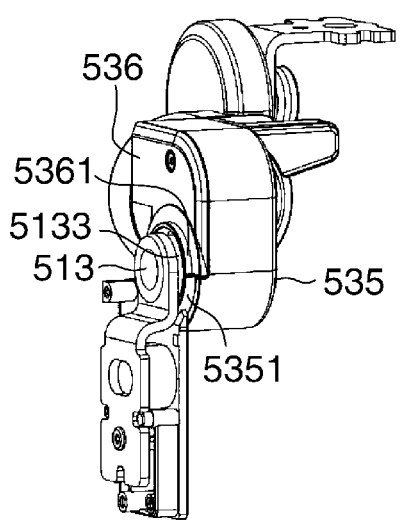
Figure 18C:
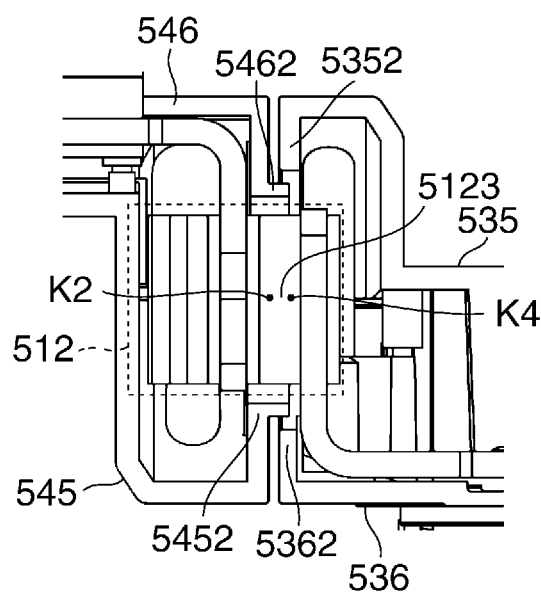
FIG. 18C is a cross-sectional view of the sheet metal member appearing in FIG. 18A to which the covers have been assembled.
Figure 19A:
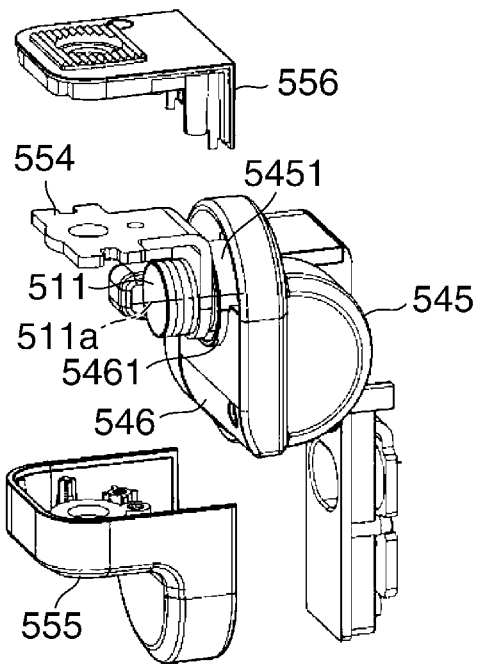
FIG. 19A is a perspective view showing how the covers are assembled to a sheet metal member.
Figure 19B:
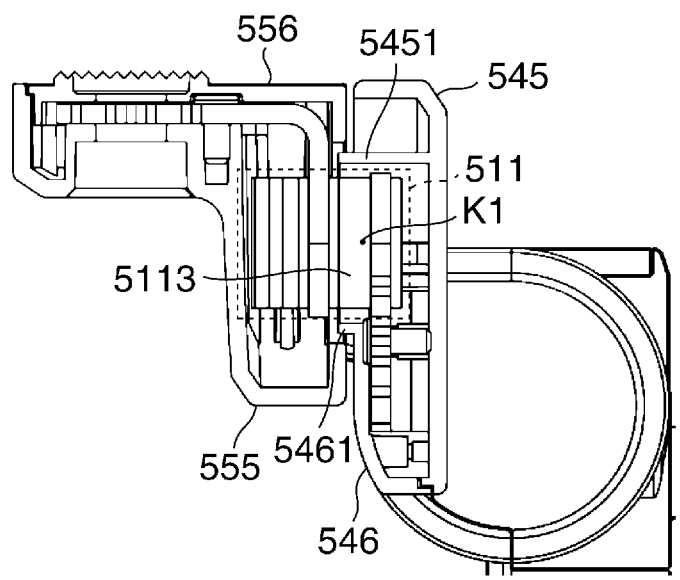
FIG. 19B is a cross-sectional view of the sheet metal member appearing in FIG. 19A to which the covers have been assembled.
Figure 20A:
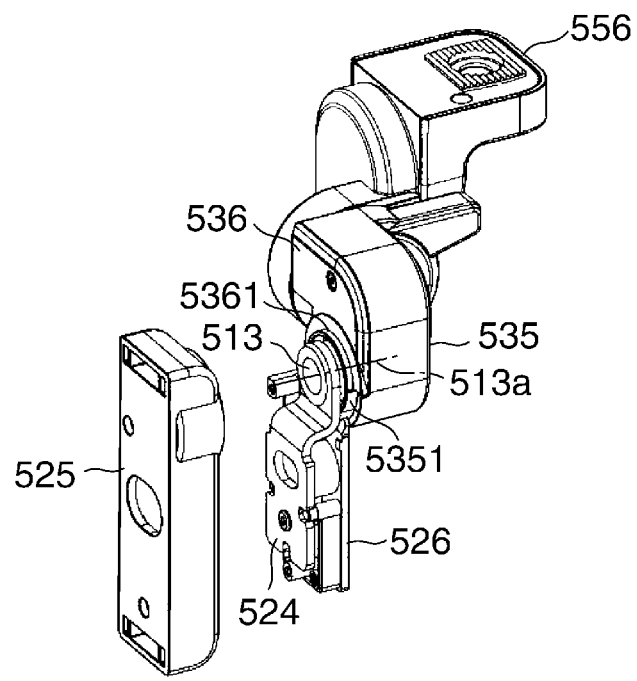
FIG. 20A is a perspective view showing how a cover is assembled to a sheet metal member.
Figure 20B:
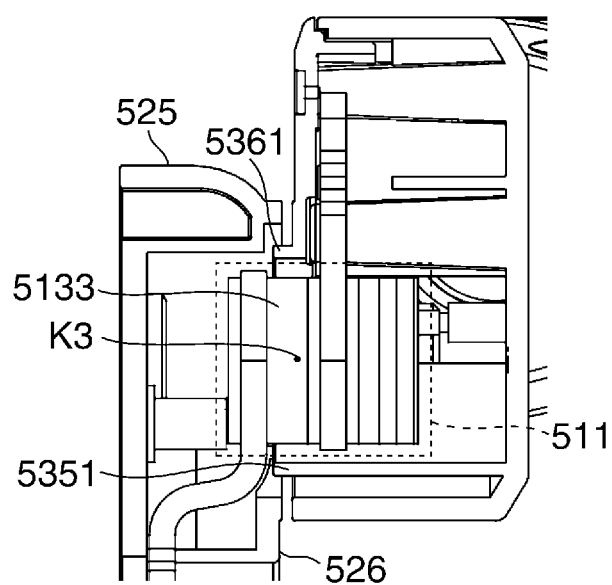
FIG. 20B is a cross-sectional view of the sheet metal member appearing in FIG. 20A to which the cover has been assembled.

FIGS. 17A to 17C are perspective views showing how covers 545 and 546 are assembled to the sheet metal member 544. FIG. 17A shows a state of the covers 545 and 546 and the sheet metal member 544 before assembly, FIGS. 17B and 17C show a state of the same after assembly. FIGS. 18A and 18B are perspective views showing how covers 535 and 536 are assembled to the sheet metal member 534. FIG. 18A shows a state of the covers 535 and 536 and the sheet metal member 534 before assembly, and FIG. 18B shows a state of the same after assembly. Further, FIG. 18C is a cross-sectional view of the rotating shaft member 512 and components therearound after assembling the covers. FIGS. 19A and 19B are views showing how covers 555 and 556 are assembled to the sheet metal member 554. FIG. 19A is a perspective view of the covers 555 and 556 and the sheet metal member 554 before assembly, and FIG. 19B is a cross-sectional view of the rotating shaft member 511 and components therearound after assembly. FIGS. 20A and 20B are views showing how a cover 525 is assembled to the sheet metal member 524 to which the cover 526 has been assembled. FIG. 20A is a perspective view of the cover 525 and the sheet metal member 524 before assembly, and FIG. 20B is a cross-sectional view of the rotating shaft member 513 and components therearound after assembly.

First, as shown in FIG. 17A, an operator assembles the cover 545 to the sheet metal member 544 from the side of the one end 5111 of the rotating shaft member 511 in a direction along an axial line of the rotational axis 511a. Next, the operator assembles the cover 546 to the sheet metal member 544 from the side of the other end 5112 of the rotational shaft member 511 in a direction along the axial line of the rotational axis 511a. The cover 545 almost completely covers the one end 5111 of the rotating shaft member 511, the other end 5122 of the rotating shaft member 512, and the sheet metal member 544. The cover 545 has semi-cylindrical portions 5451 and 5452, each having a substantially semi-cylindrical shape. The semi-cylindrical portion 5451 covers an intermediate portion 5113 (intermediate portion in the axial direction of the rotational axis 511a) of the rotating shaft member 511, which is sandwiched between the flat portion 5441 and the flat portion 5541 (see FIG. 17B). The semi-cylindrical portion 5452 covers an intermediate portion 5123 (intermediate portion in the axial direction of the rotational axis 512a) of the rotating shaft member 512, which is sandwiched between the flat portion 5442 and the flat portion 5341 (see FIG. 17C). On the other hand, the cover 546 has semi-cylindrical portions 5461 and 5462, each having a substantially semi-cylindrical shape. The semi-cylindrical portion 5461 covers the intermediate portion 5113 of the rotating shaft member 511 (see FIG. 17B). The semi-cylindrical portion 5462 covers the intermediate portion 5123 of the rotating shaft member 512 (see FIG. 17C). A boundary K1 as a joining part between the semi-cylindrical portion 5451 and the semi-cylindrical portion 5461 is located around the intermediate portion 5113 (see FIG. 19B). A boundary K2 as a joining part between the semi-cylindrical portion 5452 and the semi-cylindrical portion 5462 is located around the intermediate portion 5123 (see FIG. 18C).

Further, as shown in FIG. 18A, the operator assembles the cover 535 to the sheet metal member 534 from the side of the one end 5131 of the rotating shaft member 513 in a direction along an axial line of the rotational axis 513a. Next, the operator assembles the cover 536 to the sheet metal member 534 from the side of the other end 5132 of the rotating shaft member 513 in a direction along the axial line of the rotational axis 513a. The cover 535 almost completely covers the one end 5121 (see FIG. 15) of the rotating shaft member 512, the one end 5131 of the rotating shaft member 513, and the sheet metal member 534. The cover 535 has semi-cylindrical portions 5351 and 5352, each having a substantially semi-cylindrical shape. The semi-cylindrical portion 5351 covers an intermediate portion 5133 (intermediate portion in the axial direction of the rotational axis 513a) of the rotating shaft member 513, which is sandwiched between the flat portion 5342 and the flat portion 5241 (see FIGS. 15 and 18B). The semi-cylindrical portion 5352 covers the intermediate portion 5123 of the rotating shaft member 512 (see FIG. 18C). On the other hand, the cover 536 has semi-cylindrical portions 5361 and 5362, each having a substantially semi-cylindrical shape. The semi-cylindrical portion 5361 covers the intermediate portion 5133 of the rotating shaft member 513 (see FIGS. 18A and 18B). The semi-cylindrical portion 5362 covers the intermediate portion 5123 of the rotating shaft member 512 (see FIG. 17C). A boundary K3 as a joining part between the semi-cylindrical portion 5351 and the semi-cylindrical portion 5362 is located around the intermediate portion 5133 (see FIG. 20B). A boundary K4 as a joining part between the semi-cylindrical portion 5352 and the semi-cylindrical portion 5362 is located around the intermediate portion 5123 (see FIG. 18C).

Further, as shown in FIG. 19A, the operator assembles the cover 555 to the sheet metal member 554 from a direction perpendicular to the axial line of the rotational axis 511a. Next, the operator assembles the cover 556 to the sheet metal member 554 from an opposite side to a side on which the cover 555 has been assembled. As shown in FIG. 19B, the cover 555 and the cover 556 cover the intermediate portion 5113. Further, as shown in FIG. 20A, the operator assembles the cover 525 to the sheet metal member 524 from an opposite side to a side on which the cover 526 has been assembled in the direction along the axial line of the rotational axis 513a. As shown in FIG. 20B, the cover 525 and the cover 526 cover the intermediate portion 5133.

By assembling the hinge sub unit 57 in the above-described manner, it is possible to arrange each cover boundary on an intermediate portion between each two associated arm portions, and thereby improve the appearance quality. For example, since the cover 555 and the cover 556 are assembled around the intermediate portion 5113 at respective locations close to the boundary K1 (see FIG. 19B), the boundary K1 is unobtrusive, which improves the appearance quality. Further, the boundary K2 and the boundary K4 are close to each other around the intermediate portion 5123 (see FIG. 18C), and hence the boundary K2 and the boundary K4 are unobtrusive, which improves the appearance quality. Further, since the cover 525 and the cover 526 are assembled around the intermediate portion 5133 at respective locations close to the boundary K3 (see FIG. 20B), the boundary K3 is unobtrusive, which improves the appearance quality. Further, for example, the joining part between the cover 545 and the cover 546, and the joining part between the cover 555 and the cover 556 are arranged around the intermediate portion 5113, and hence the cover joining parts are unobtrusive, which improves the appearance quality (see FIG. 19B). Further, the joining part between the cover 525 and the cover 526, and the joining part between the cover 535 and the cover 536 are arranged around the intermediate portion 5133, and hence the cover joining parts are unobtrusive, which improves the appearance quality (see FIG. 20B).

According to the present embodiment, the protruding portion 531 is brought into contact with the protruding portion 561 in the middle of rotation of the display panel 3 remaining in the predetermined rotational position about the rotational axis 511a, from the first position to the third position. The protruding portion 531 functions as a rotation stopper, and restricts the rotation of the display panel 3 in a direction toward the third position to thereby position the display panel 3 in the second position. This makes it possible to stably fix the rotational position of the display panel 3 in the second position. After that, the user can release the engagement between the protruding portion 531 and the protruding portion 561 by changing the rotational position of the display panel 3 about the rotational axis 511a from the predetermined rotational position in the direction B (see FIG. 12A), and then shift the display panel 3 to the third position. Therefore, it is possible to perform the operation for fixing the display panel 3 in the second position, and releasing the same from the fixed state with simple operations.

Further, when the display panel 3 remaining in the predetermined rotational position is rotated from the third position to the first position, the protruding portion 531 crosses over the protruding portion 561 by the action of the slope 563 as the tapered surface, whereby the engagement between the protruding portions 531 and 561 is released. This makes it easy to perform the operation for shifting the display panel 3 from the third position to the second or first position.

Further, the boundary K1 between the semi-cylindrical portion 5451 and the semi-cylindrical portion 5461 is located on the intermediate portion 5113 in the axial direction of the rotational axis 511a, and the boundary K2 between the semi-cylindrical portion 5452 and the semi-cylindrical portion 5462 is located on the intermediate portion 5123 in the axial direction of the rotational axis 512a. This makes the boundaries between the covers unobtrusive, and thereby improves the appearance quality.

Although the protruding portion 561 is provided on the lower surface of the base unit 56, this is not limitative, but the protruding portion 561 may be provided any suitable location insofar as the protruding portion 561 is provided on the main body unit 100 or on a portion fixed to the main body unit 100, and for example, the protruding portion 561 may be provided on the handle 4.

Although the slope 563 is formed on the protruding portion 561, the tapered surface corresponding to the slope 563 may be formed on at least one of the protruding portion 531 and the protruding portion 561. In this case, the tapered surface is formed on a side of one of the protruding portion 531 and the protruding portion 561, opposite to a side of the same with which the other is brought into contact when the display panel 3 is rotated from the first position toward the third position.

Figure 21:
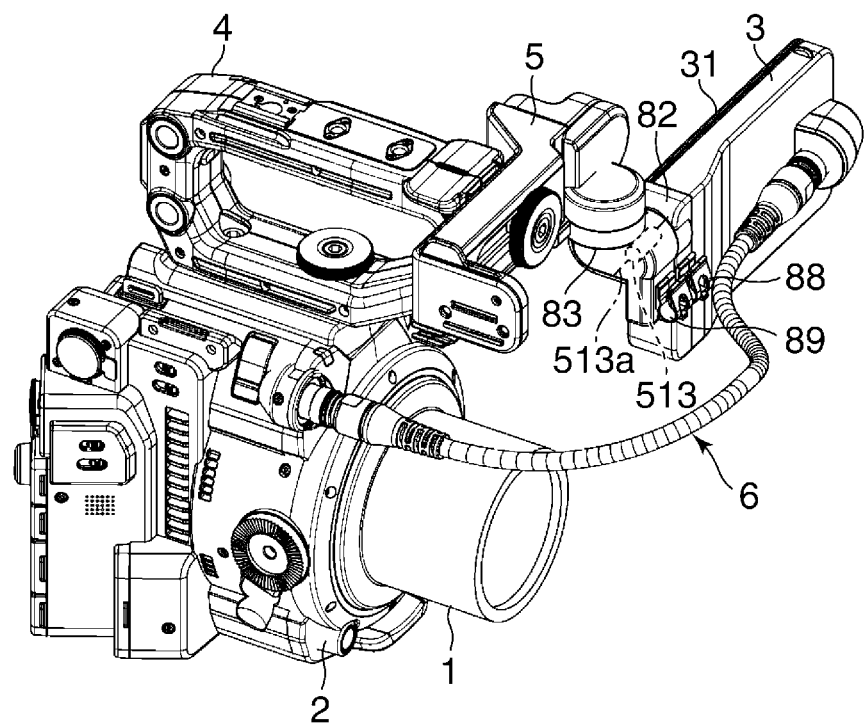
FIG. 21 is a perspective view of an image pickup system according to a third embodiment.

Next, a description will be given of a third embodiment of the present invention. FIG. 21 is a perspective view of an image pickup system according to the third embodiment. The apparatus body 2 and the display panel 3 are the same as those of the first embodiment. The hinge unit 5 differs from that of the first embodiment in that arm portions 82 and 83 are included in place of the arm portions 52 and 53, and other components are the same as those of the first embodiment. The arm portions 82 and 83 differ from the arm portions 52 and 53 in that clamp members 88 and 89 are provided, respectively. The clamp members 88 and 89 have the same construction, and hence the clamp member 88 will be described as a representative.

Figure 22:
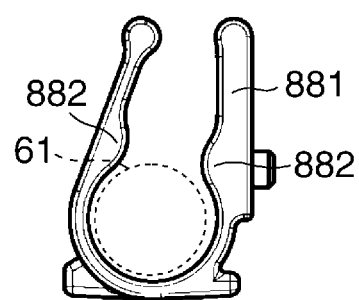
FIG. 22 is a view of a clamp member.

FIG. 22 is a view of the clamp member 88. The clamp member 88 includes a main portion 881 having a substantially U-shaped portion, and an engaged portion 882 which can be flexed with respect to the main portion 881. The clamp member 88 can stably hold a bar-shaped member 61 having a bar shape including a cylindrical shape, or the like. The clamp member 88 can hold the bar-shaped member 61 such that the axial direction of the bar-shaped member 61 is substantially parallel to the axial direction of the rotating shaft member 513 (rotational axis 513a). In a direction perpendicular to the axial direction of the rotational axis 513a, a distance from the rotational axis 513a to the axial center of the clamp member 88 is approximately equal to a distance from the rotational axis 513a to the axial center of the clamp member 89. Therefore, if the rotational positions of the arm portions 82 and 83 relative to each other are adjusted to make the axial centers of the clamp members 88 and 89 coincide with each other, the clamp members 88 and 89 can hold the same bar-shaped member 61.

Figure 23:
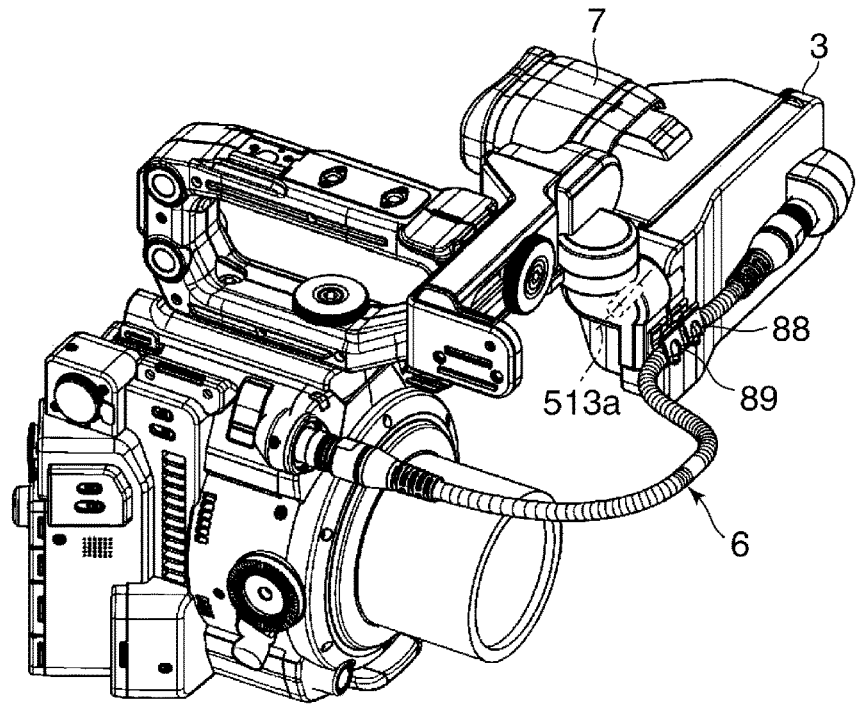
FIG. 23 is a perspective view of the image pickup system.

In FIG. 21, the display panel 3 is in the second position. When the display panel 3 is in this position, the clamp members 88 and 89 are adjacent to each other in a coaxial positional relationship. If the bar-shaped member 61 is held by the clamp members 88 and 89 in the state in which the clamp members 88 and 89 are coaxial to each other, it is possible to restrict rotation of the arm portion 82 and the arm portion 83 relative to each other about the rotational axis 513a. In the present embodiment, as shown in FIG. 23, when the display panel 3 is in the second position, by causing the clamp members 88 and 89 to simultaneously hold a flexible portion of the signal cable 6 instead of the bar-shaped member 61, it is possible to suppress rotation of the arm portion 82. By doing this, even when a load is applied to the display panel 3 from the vertical direction, the arm portion 82 is prevented from being easily rotated. Further, as shown in FIG. 23, even when an accessory, such as the external finder 7, is attached to the display panel 3, it is possible to prevent the display panel 3 from being unintentionally rotated due to the weight of the accessory.

According to the present embodiment, it is possible to obtain the same advantageous effects as provided by the first embodiment in making it possible to fix the display panel 3 to the second position, and release the display panel 3 from the fixed state with simple operations. Further, it is possible to restrict rotation of the display penal 3 by causing the clamp members 88 and 89 to hold the same bar-shaped member. What is more, it is possible to restrict rotation of the display penal 3 with a normal operation for causing the clamp members 88 and 89 to hold the signal cable 6 without increasing the number of components, which reduces troublesomeness in handling the signal cable 6.

Although in the present embodiment, the description is given of restriction of rotation between the arm portions 82 and 83 by way of example, this is not limitative. Therefore, the clamp members 88 and 89 may be arranged on a first rotating member and a second rotating member, having a relative rotational relationship with respect to a predetermined rotational axis, which are selected from the components included in the rotating body, e.g. the plurality of rotating members interposed between the display panel 3 and the main body unit 100. For example, the above construction may be applied to restriction of rotation between the arm portions 53 and 54, and between the arm portions 54 and 55. In the illustrated example in FIGS. 21 to 23, the rotational axis 513a out of the plurality of rotational axes is the predetermined rotational axis, the arm portions 82 and 83 are the first and second rotating members, and the clamp members 88 and 89 are first and second holding portions. Note that the bar-shaped member 61 may be separately prepared for restriction of rotation.

Focusing only on the effect of making it possible to fix the display panel 3 to the second position, and release the display panel 3 from the fixed state with simple operations, the hinge unit 5 is only required to be configured to include at least two rotational axes. Note that the rotating body which is connected to the main body unit 100 such that the rotating body is rotatable about each of the at least two rotational axes is not limited to the display panel 3, but it may be any other accessory.

A system constructed by symmetrically arranging part or all of the components of the above-described image pickup system may be employed as the image pickup system of the present invention.

Figure 24:
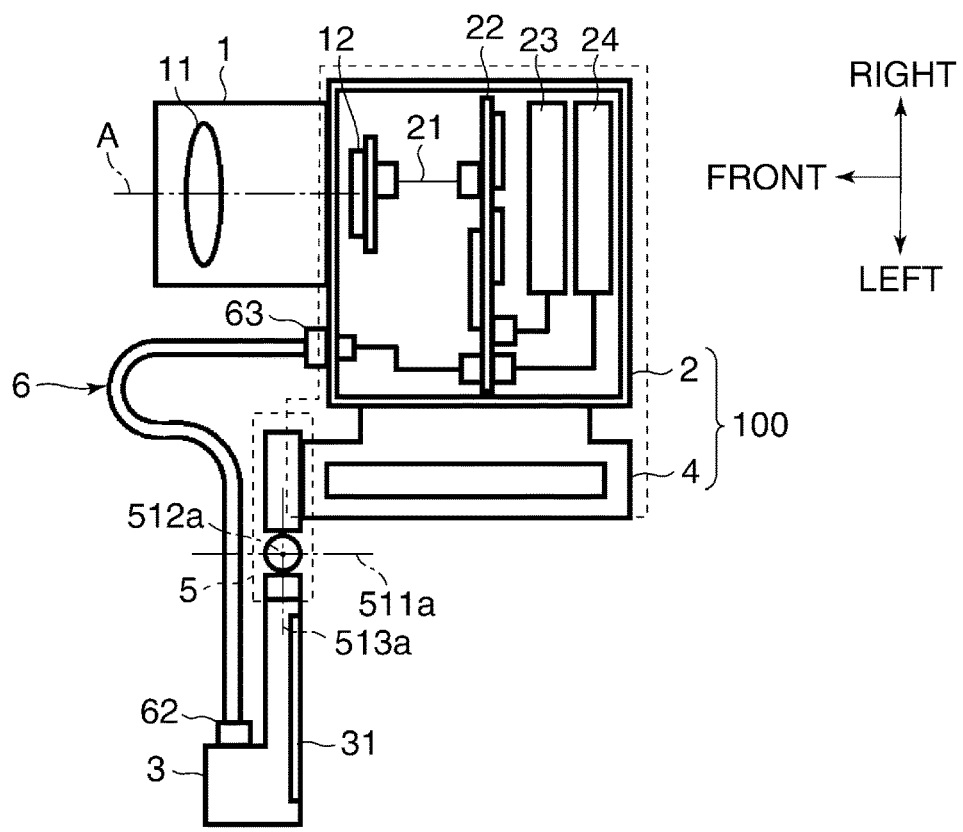
FIG. 24 is a schematic top view of an image pickup system according to a fourth embodiment.

Next, a description will be given of a fourth embodiment of the present invention. FIG. 24 is a schematic top view of an image pickup system according to the fourth embodiment. This image pickup system includes the main body unit 100, the lens barrel 1, and the accessory group. The main body unit 100 is comprised of the image pickup apparatus body 2 (hereinafter abbreviatedly referred to as the apparatus body 2) and the handle 4. The handle 4 can be attached to and removed from the apparatus body 2. The accessory group includes the display panel unit 3 (hereinafter abbreviatedly referred to as the display panel 3) that displays an image, the hinge unit 5, and the signal cable 6. Hereinafter, right and left directions, and upward and downward directions of the image pickup system refer to directions as viewed from a photographer at the time of photographing (see FIGS. 24 and 29B).

The lens barrel 1 can be mounted on and removed from the apparatus body 2, and includes a lens 11 having the optical axis A (photographing optical axis). In the apparatus body 2, the image pickup device 12 converts optical information of an optical image formed via the lens 11 into electric signals, and transfers the electric signals to the circuit board 22 via the flexible circuit board 21. The circuit board 22 sends the electric signals received from the image pickup device 12 to the display panel 3 to display through images, and sends the electric signals to the recording section 23 to record the same. The power supply section 24 supplies electric power for performing the above-mentioned processing. A photographer (user) can hold the handle 4, to thereby support the main body unit 100 when performing photographing and carry the main body unit 100 when not performing photographing. The hinge unit 5 can rotatably connect the display panel 3 to the main body unit 100. The hinge unit 5 has three degrees of freedom based on three rotational axes (rotational axis 511a: first rotational axis), (rotational axis 512a: second rotational axis), and (rotational axis 513a: third rotational axis), and can change the posture (position and orientation) of the display panel 3. The hinge unit 5 can be attached to and removed from the handle 4 and the display panel 3 e.g. by a known screw fastening method. The signal cable 6 can be connected to and removed from the display panel 3 and the apparatus body 2, and can electrically connect the two. When the display panel 3 and the apparatus body 2 are connected by the signal cable 6, signal communication and supply of power between the two are enabled. The signal cable 6 has a flexible portion 61A having flexibility, and the flexible portion 61A has opposite ends provided with holding portions 62 and 63, respectively, which are held by a photographer when the signal cable 6 is connected to and removed from the display panel 3 and the apparatus body 2.

Figure 25A:
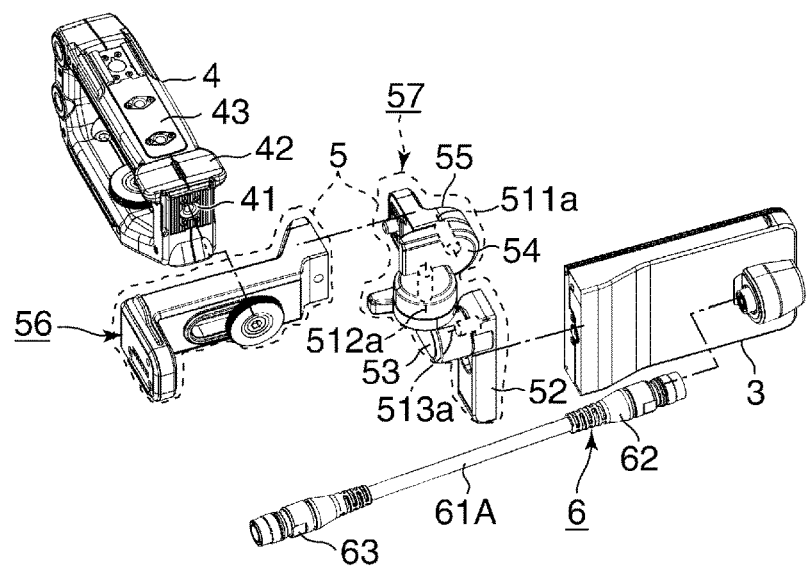
FIG. 25A is an exploded perspective view of an accessory group.
Figure 25B:
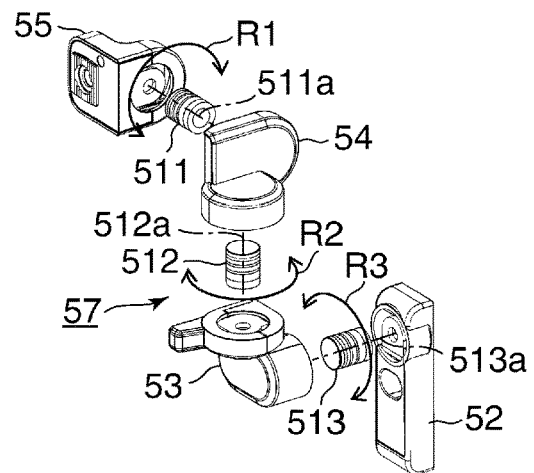
FIG. 25B is an exploded perspective view of a hinge sub unit.
Figure 25C:
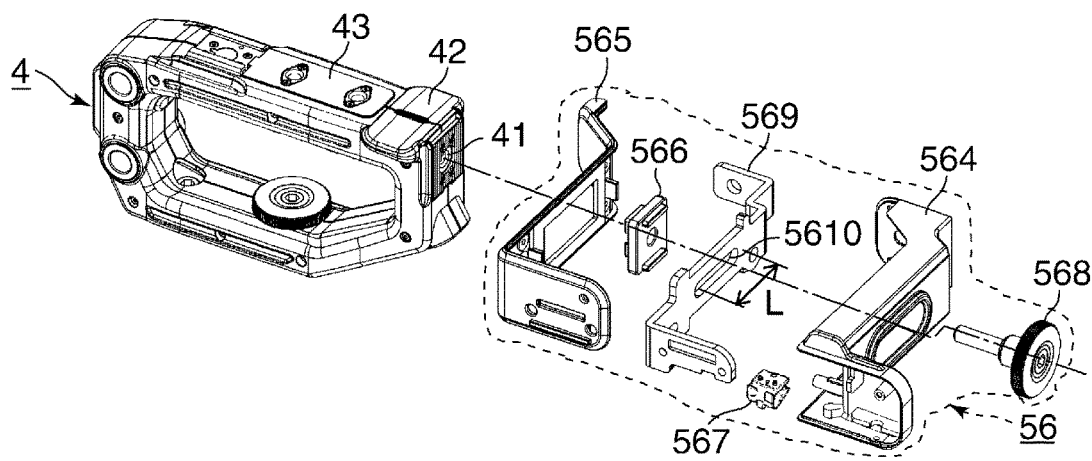
FIG. 25C is an exploded perspective view of a base unit.

FIGS. 25A, 25B, and 25C are exploded perspective views of the accessory group, the hinge sub unit 57, and the base unit 56, respectively. In FIGS. 25A to 25C, the handle 4 is also illustrated for convenience of explanation.

The hinge unit 5 can be separated from and connected to the handle 4 by a known screw fastening method. The hinge unit 5 is comprised of the base unit 56 and the hinge sub unit 57, which are connected by a known screw fastening method (see FIG. 25A). The handle 4 includes a fixing portion 41 and a finger hooking portion 42. As shown in FIGS. 25A and 25B, the hinge sub unit 57 includes not only rotating shaft members 511, 512, and 513, each having a fixed resistive torque, but also arm portions 52, 53, 54, and 55. The centers of rotation of the rotating shaft members 511, 512, and 513 correspond to the rotational axes 511a, 512a, and 513a, respectively. The arm portion 54 can be rotated in a direction indicated by an arrow R1 about the rotational axis 511a with respect to the arm portion 55. The arm portion 53 can be rotated in a direction indicated by an arrow R2 about the rotational axis 512a with respect to the arm portion 54. The arm portion 52 can be rotated in a direction indicated by an arrow R3 about the rotational axis 513a with respect to the arm portion 53. The arm portion 53 includes a protruding portion 531 (second engagement portion).

The base unit 56 is comprised of a fixing screw 568, a sheet metal member 569, an exterior cover 564, an exterior cover 565, a positioning member 566, and a clamp member 567 (see FIG. 25C), and can be attached to and removed from the handle 4. The base unit 56 is fastened to the fixing portion 41 formed on the handle 4 with the fixing screw 568. The sheet metal member 569 is formed with a slit-shaped portion 5610, and the position of the base unit 56 can be adjusted with respect to the handle 4 within a range of a slit length L. The clamp member 567 holds the flexible portion 61A as described hereinafter.

The arm portion 52 can be attached to and removed from the display panel 3. The base unit 56 and the arm portion 55 form a first member which can be attached to and removed from the main body unit 100. The arm portion 54 forms a second member which is rotatable about the rotational axis 511a with respect to the arm portion 55 via the rotating shaft member 511. The arm portion 53 forms a third member which is rotatable about the rotational axis 512a with respect to the arm portion 54 (second member) via the rotating shaft member 512. The arm portion 52 forms a fourth member which is rotatable about the rotational axis 513a with respect to the arm portion 53 (third member) via the rotating shaft portion 513.

Figure 26A:
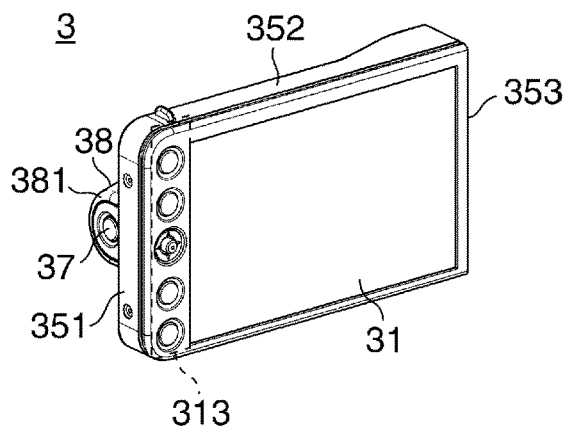
FIG. 26A is a perspective view of the display panel, as viewed from the display section.
Figure 26B:
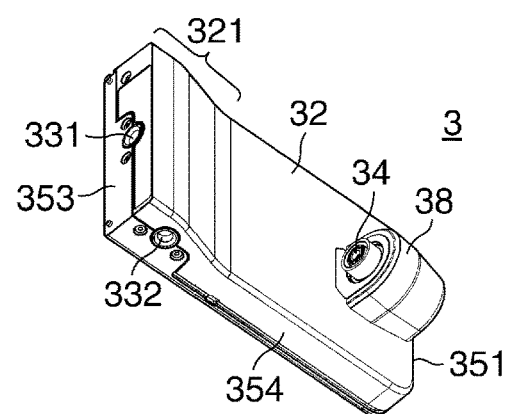
FIG. 26B is a perspective view of the display panel, as viewed from the rear.
Figure 26C:
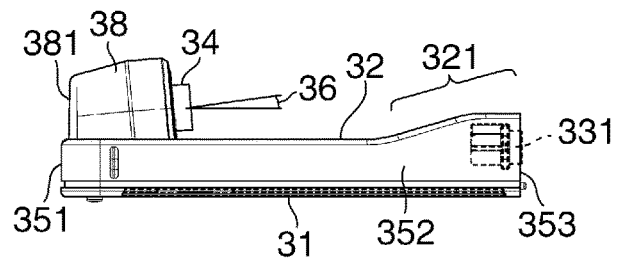
FIG. 26C is a side view of the display panel, as viewed from a lateral direction.
Figure 26D:
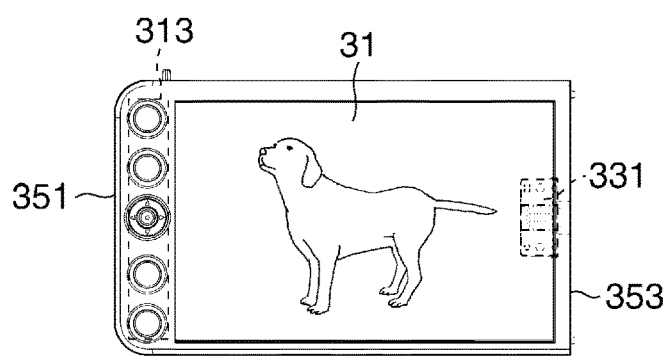
FIGS. 26D and 26E are front views of the display panel.
Figure 26E:
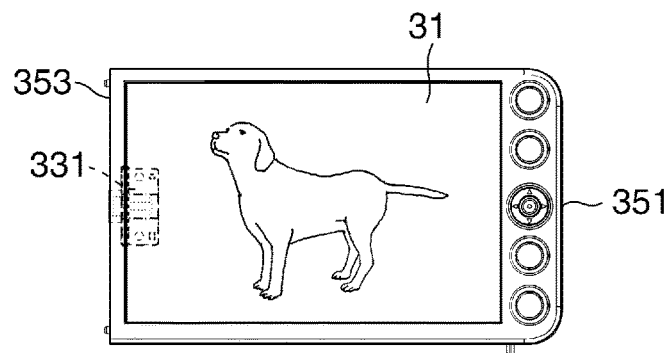

The display panel 3 will be described in detail with reference to FIGS. 26A to 26E. FIGS. 26A and 26B are perspective views of the display panel 3, as viewed from the display section and the rear, respectively. The display panel 3 includes the display section 31. A display surface is provided on a surface of the display section 31. FIG. 26C is a side view of the display panel 3, as viewed from a lateral direction, and FIGS. 26D and 26E are front views of the display panel 3. The shape of the display panel 3 as viewed from a direction perpendicular to the display section 31 is a substantially rectangle, more specifically, an oblong, having sides 351, 352, 353, and 354, corresponding to the sides of the rectangle. The sides 353 and 351 are a first end and a second end in the longitudinal direction of the display panel 3, respectively, and form a pair of opposite sides. That is, the second end (side 351) is an opposite-side end of the first end (side 353). Further, the sides 352 and 354 are opposite ends in the lateral direction of the display panel 3, and form a pair of opposite sides. The sides 351 and 353 are perpendicular to the sides 352 and 354.

The side 353 is formed with a fixing portion 331 as a coupling portion for coupling the hinge unit 5 to the display panel 3 (see FIG. 26B). The display panel 3 can be attached to and removed from the arm portion 52 of the hinge unit 5 via the fixing portion 331 with a known screw, not shown. In the present embodiment, a ¼-inch screw used for a tripod fixing portion of a camera or the like, is used. The fixing portion 331 is provided in substantially the center of the side 353 in the lateral direction of the display panel 3. Further, the side 354 is formed with a fixing portion 332 having the same shape as that of the fixing portion 331 such that the fixing portion 332 is exposed from the side 354 (see FIG. 26B).

A protruding portion 38 is provided on a rear surface 32 of the display panel 3 at a location close to the side 351, as a connection portion for connecting the signal cable 6, such that the protruding portion 38 protrudes from the rear surface 32 (see FIGS. 26B and 26C). The protruding portion 38 has a connection terminal 34 into which and out of which the signal cable 6 is inserted and pulled out. The direction of inserting and pulling the signal cable 6 into and out of the connection terminal 34 is substantially parallel to the rear surface 32 of the display panel 3, though with a gradient 36, referred to hereinafter. The signal cable 6 connected to the connection terminal 34 extends in a direction toward the fixing portion 331 (toward the side 353) along the rear surface 32 (also see FIG. 28A). Further, a rising portion 321 which rises in a direction of the thickness of the display panel 3 is formed on the rear surface 32 of the display panel 3 at a location close to the side 353. The direction in which the signal cable 6 extends from the connection terminal 34 has the gradient 36 with respect to the rear surface 32 such that signal cable 6 extends while avoiding the rising portion 321 (see FIG. 26C). The gradient 36 has an acute angle.

The fixing portion 331 is formed inside the rising portion 321, and overlaps the display section 31 when viewed from the direction perpendicular to the display section 31 (see FIGS. 26C to 26E). That is, the fixing portion 331 is arranged such that a shadow of the fixing portion 331 imaginarily projected in a direction perpendicular to the display section 31 overlaps the display section 31. This contributes to size reduction of the display panel 3 in the longitudinal direction. The protruding portion 38 has a display inversion key 37 arranged on a side 381 opposite to the connection terminal 34 as an operation element (see FIG. 26A). By pressing the display inversion key 37, the user can rotate the displayed content on the display section 31 through 180° (see FIGS. 26D and 26E). The display section 31 has the touch panel function, and further, the display section 31 is provided with an operation key group 313. The photographer can perform a shooting operation, a setting change operation, and so forth, by touching the touch panel with his/her finger or pressing an associated key of the operation key group 313.

Figure 27A:
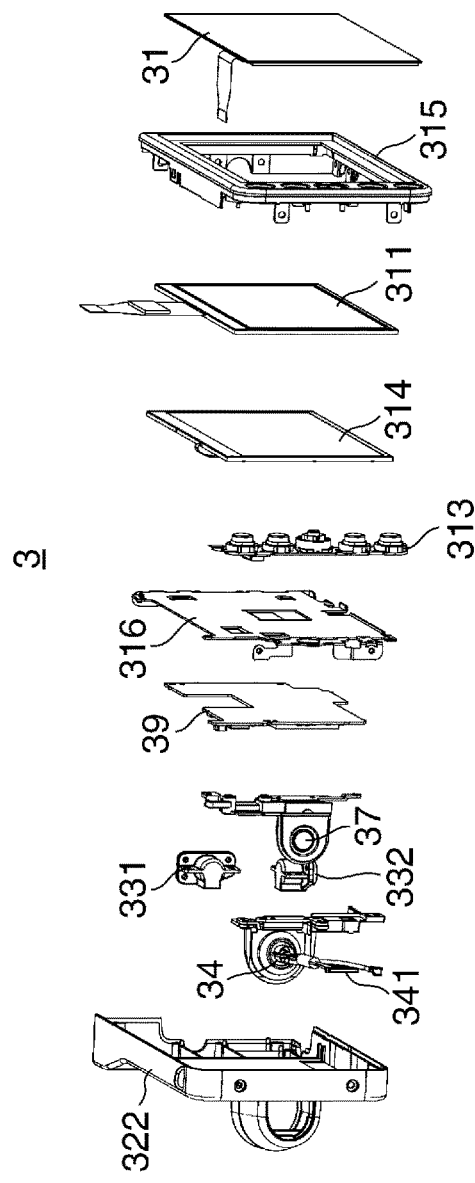
FIG. 27A is an exploded perspective view of the display panel, as viewed from the display section.
Figure 27B:
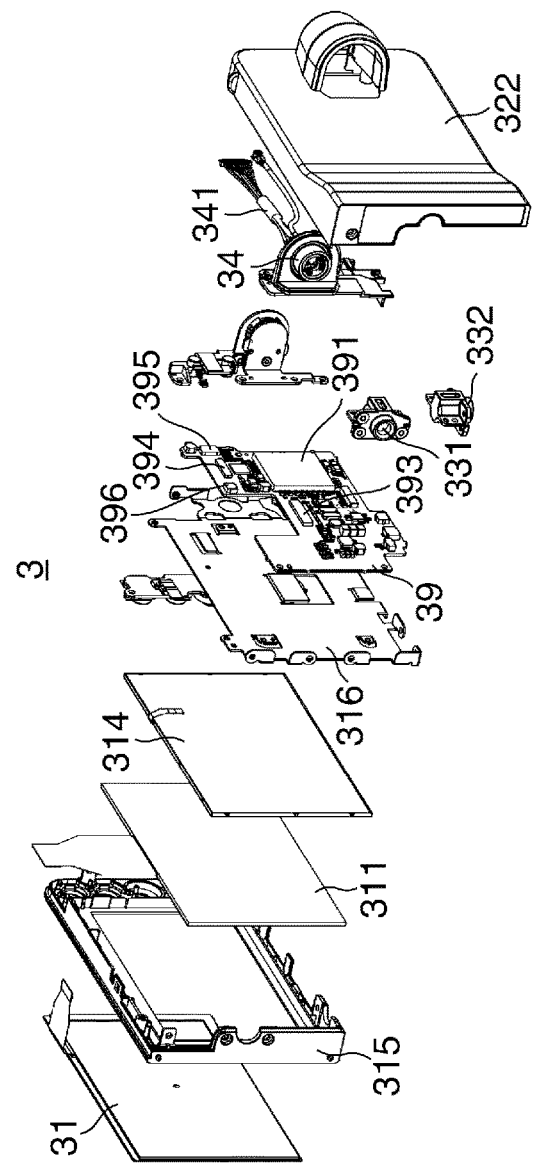
FIG. 27B is an exploded perspective view of the display panel, as viewed from the rear.

FIGS. 27A and 27B are exploded perspective view of the display panel 3. The display panel 3 includes the display section 31, an exterior cover 315, a display module 311, a backlight 314, a display module-holding member 316, a circuit board 39, the connection terminal 34, and a rear exterior cover 322, as main components thereof arranged in the mentioned order from the side of the display section 31. The display module 311, the display section 31, the operation key group 313, and the backlight 314 are connected to connectors 393, 394, 395, and 396, mounted on the circuit board 39, respectively.

Figure 28A:
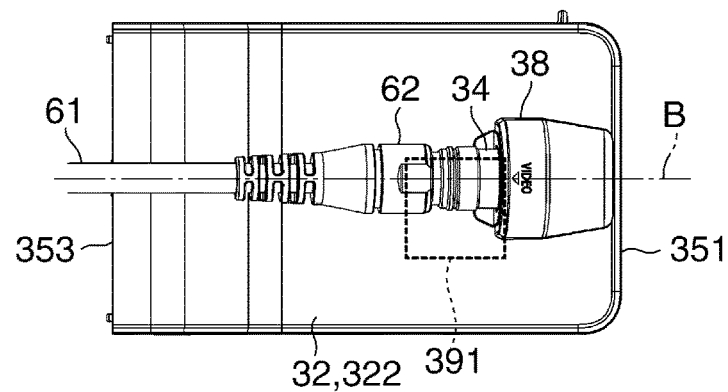
FIG. 28A is a rear view of the display panel.
Figure 28B:
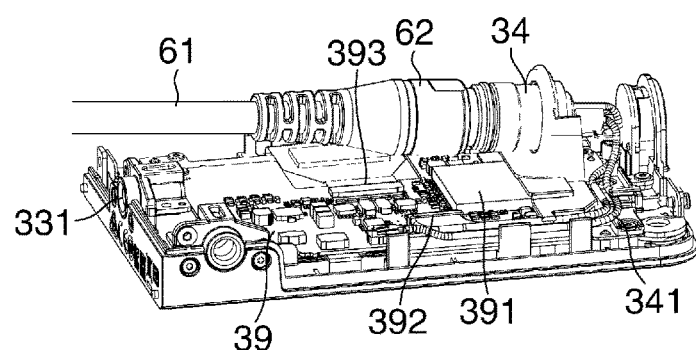
FIG. 28B is a perspective view of the display panel.
Figure 28C:
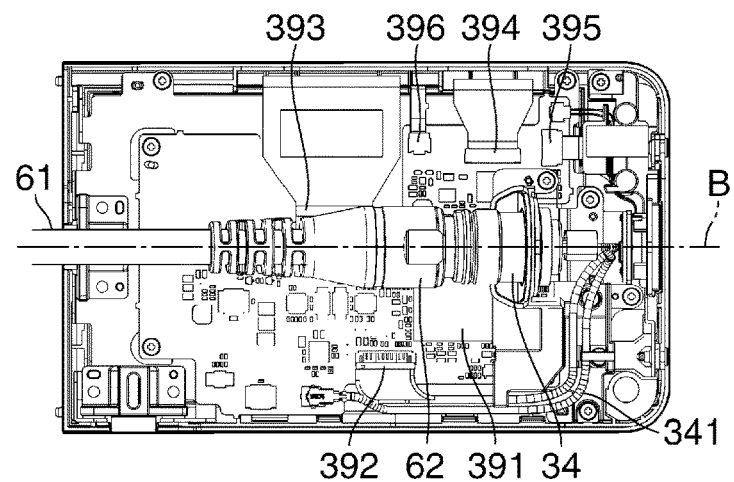
FIG. 28C is a rear view of the display panel.

FIG. 28A is a rear view of the display panel 3 to which the signal cable 6 has been connected. FIGS. 28B and 28C are a perspective view and a rear view of the display panel 3, respectively, from which the rear exterior cover 322 is omitted. The signal cable 6 is arranged to be drawn out of the connection terminal 34 and extend toward the side of the display panel 3, where the fixing portion 331 is provided, i.e. toward the side 353 (see FIG. 28A).

The display panel 3 incorporates the circuit board 39. The circuit board 39 performs processing for displaying images corresponding to electric signals sent from the image pickup device 12 as through images, and transmitting signals input from the touch panel, the operation key group 313 or the display inversion key 37 of the display panel 3 to the apparatus body 2. A device 391 mounted on the circuit board 39 performs most part of these processing operations. Therefore, the device 391 is an element which is the largest in power consumption out of the parts and devices within the display panel 3, i.e. a main heat generating component. Connectors 392 to 396 are arranged at respective locations closer to the display section 31 than the device 391 in the thickness direction of the display panel 3. Signals input from the touch panel and the operation key group 313 of the display section 31, and the display inversion key 37 are input to the device 391 via the connectors 394, 395, and 396, respectively, where the processing operations are performed on the input signals, and then the processed signals are output from the connector 392 to the connection terminal 34.

A wire 341 of the connection terminal 34 is connected to the connector 392. Electric signals sent from the image pickup device 12 are input to the circuit board 39 via the connector 392, and then input to the device 391, where the processing operations are performed on the electric signals, and then the processed signals are sent to the display module 311 via the connector 393. The connection terminal 34 is disposed close to a center position B in the lateral direction of the display panel 3. The device 391 is disposed and mounted at a location opposed to the protruding portion 38 including the connection terminal 34 and the holding portion 62 of the signal cable 6, across the rear exterior cover 322.

Since the device 391 is the largest in power consumption of the elements within the display panel 3, the rear exterior cover 322 has a temperature distribution in which an area where a shadow of the device 391 is imaginarily projected in a direction perpendicular to the rear surface 32 is the highest in temperature. Here, the protruding portion 38, the signal cable 6, and the device 391 overlap with each other, as viewed from the direction perpendicular to the display section 31 (see FIG. 28A). That is, the protruding portion 38 and the holding portion 62 of the signal cable 6 are arranged such that shadows of the protruding portion 38 and the holding portion 62 imaginarily projected in the direction perpendicular to the display section 31 overlap with the area where the temperature can become relatively high. This prevents the photographer from touching the area where the temperature can become relatively high during photographing, and suppresses the photographer from feeling uncomfortable.

Next, the representative positions (postures) of the display panel 3 with respect to the apparatus body 2 will be described with reference to FIGS. 29A to 32B. FIGS. 29A to 29C, 30A and 30B, 31A to 31C, and 32A and 32B are views of the image pickup system in which the display panel 3 is set to a first photographing position, a second photographing position, a first accommodated position, and a second accommodated position, respectively. In FIGS. 29A to 32B, the hinge unit 5 is fixed to the handle 4 and the display panel 3, and the display panel 3 is electrically connected to the apparatus body 2 via the signal cable 6.

Figure 29A:
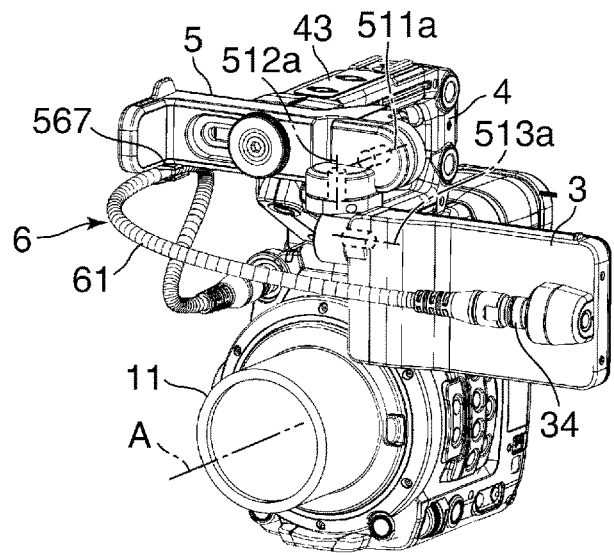
FIG. 29A is a perspective view of the image pickup system in a state in which the display panel is set to a first photographing position.
Figure 29B:
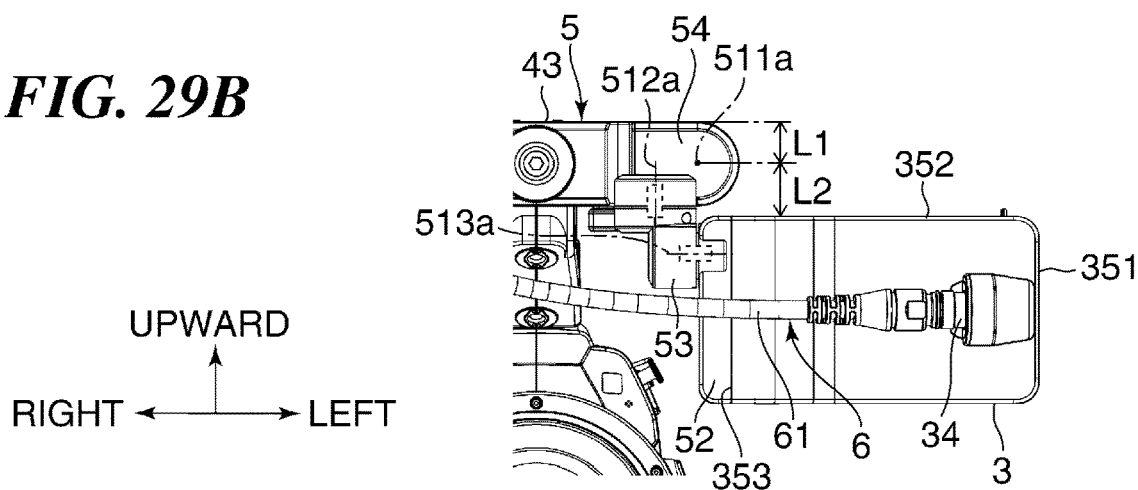
FIG. 29B is a view of part of the image pickup system, shown in FIG. 29A, as viewed from the object side in a direction along an optical axis A.
Figure 29C:
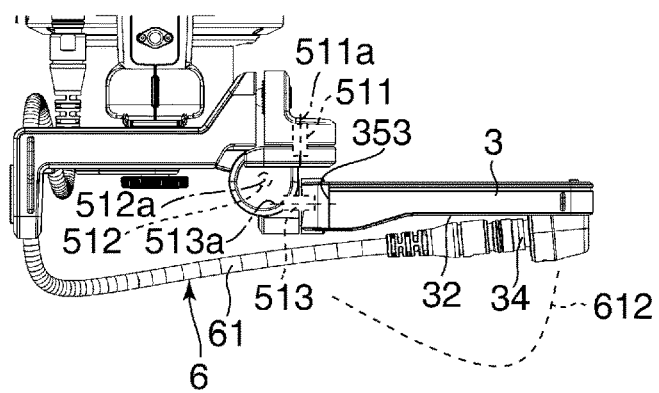
FIG. 29C is a partial top view of the image pickup system, shown in FIG. 29A.

First, the first photographing position is a position in which the display section 31 of the display panel 3 is beside (on the left side of) the handle 4 of the main body unit 100 and is opposed to the photographer. FIGS. 29A to 29C are a perspective view of the main body unit 100, a view of the same, as viewed from the object side in a direction along the optical axis A, and a partial top view of the same, respectively. The flexible portion 61A is held by the clamp member 567 provided on the hinge unit 5, whereby the flexible portion 61A is prevented from being brought into contact with the lens barrel 1 and entering the angle of view. The rotational axis 511a is substantially parallel to the optical axis A, and the rotational axis 513a is substantially parallel to the longitudinal direction of the display panel 3. The rotational axis 513a is substantially perpendicular to the side 351 and the side 353, and is substantially parallel to (the display surface of) the display section 31. The rotational axis 512a is always substantially perpendicular to both of the rotational axis 511a and the rotational axis 513a.

As shown in FIG. 29C, the signal cable 6 extends toward the side 353 in substantially parallel with the rear surface 32. Therefore, the flexible portion 61A is prevented from protruding from the display panel 3 as in a case where the signal cable 6 is extended to be bent outward from the rear surface 32 (denoted by reference numeral 612), whereby an area occupied by the flexible portion 61A can be made small.

Figure 30A:
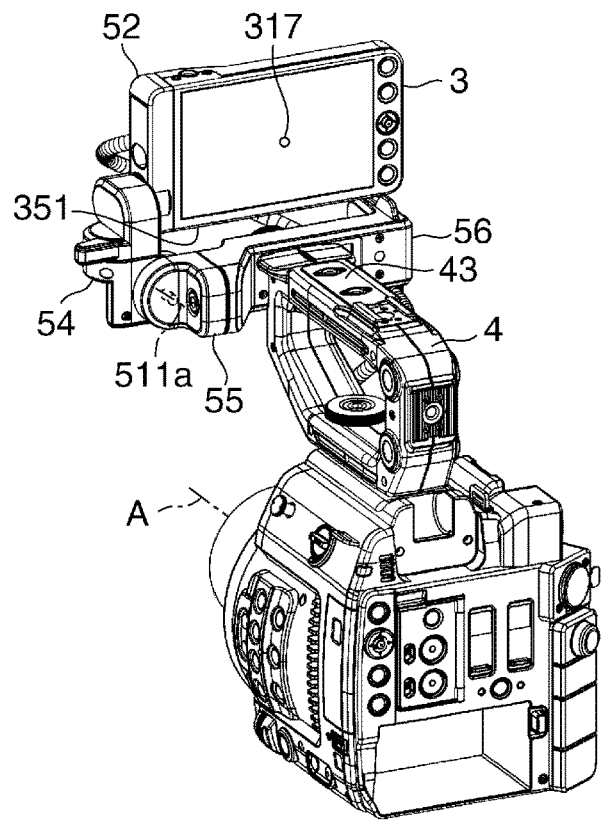
FIG. 30A is a perspective view of the image pickup system in a state in which the display panel is set to a second photographing position.
Figure 30B:
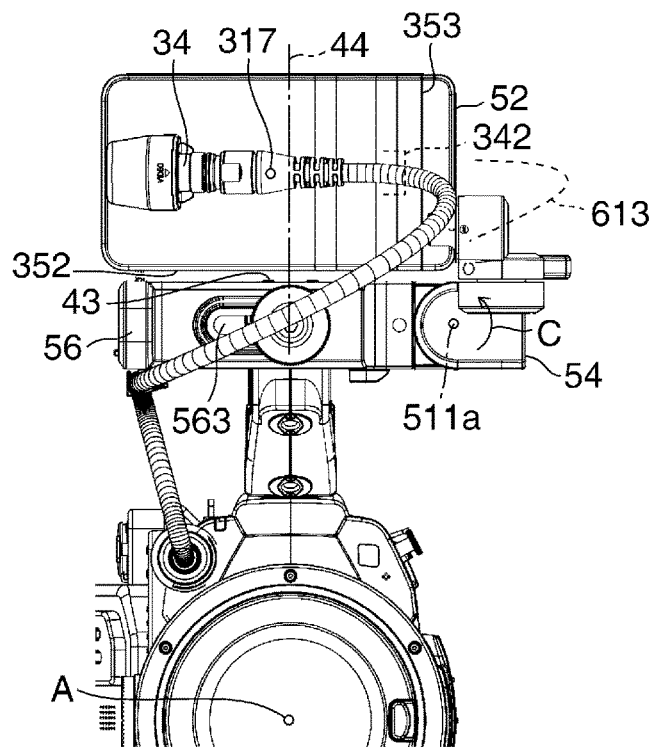
FIG. 30B is a view of part of the image pickup system, shown in FIG. 30A, as viewed from the object side in the direction along the optical axis A.

FIGS. 30A and 30B are a perspective view of the main body unit 100 in the second photographing position, and a view of the main body unit 100, as viewed from the object side in the direction along the optical axis A, respectively. In the second photographing position, the display panel 3 is positioned above the handle 4. From the first photographing position of the display panel 3, by rotating the arm portion 54 about the rotational axis 511a through 180° in a direction indicated by an arrow C in FIG. 30B (anticlockwise direction, as viewed from the object), the display panel 3 is shifted to the second photographing position.

As shown in FIG. 29B, a distance between a position of an upper end (upper surface 43 of the handle 4) of the main body unit and the rotational axis 511a in the vertical direction is defined as L1. Further, when the display panel 3 is in the first photographing position, a distance between a position of an upper end (the side 352) of the display panel 3 and the rotational axis 511a in the vertical direction is defined as L2. Here, the distance L1 and the distance L2 are substantially equal to each other (L1≈L2). Therefore, when the display panel 3 is rotated about the rotational axis 511a through 180° to be shifted to the second photographing position, it is possible to make a position of a lower end (side 352) of the display panel 3 close to the position of the upper end (the upper surface 43) of the handle 4 (see FIG. 30B).

This realizes size reduction of the whole image pickup system in the vertical direction. Note that the upper end of the base unit 56 of the hinge unit 5 and the upper surface 43 of the handle 4 are substantially equal in position in the vertical direction.

The photographer can shift the display panel 3 between the first photographing position and the second photographing position with a simple single operation. Further, the side 351 is a free end with respect to the rotation about the rotational axis 511a. The connection terminal 34 is disposed close to this free end, and hence the area occupied by the flexible portion 61A can be made small. If the connection terminal 34 is disposed in another position (for example, a position denoted by reference numeral 342 in FIG. 30B), the flexible portion 61A protrudes from the display panel 3 (denoted by reference numeral 613 in FIG. 30B), which increases the area occupied by the flexible portion 61A, and makes it difficult to handle the flexible portion 61A.

Incidentally, by moving the hinge sub unit 57 within the range of the length L of the slit-shaped portion 5610 (see FIG. 25C) formed in the sheet metal member 569, it is possible to adjust the positions of the handle 4 and the display panel 3 relative to each other in the right-left direction in the first and second photographing positions. For example, it is possible to cause a center 44 of the handle 4 in the right-left direction and a center 317 of the display section 31 in the longitudinal direction of the display section 31 to substantially coincide with each other in the second photographing position. The center 44 of the handle 4 is designed to coincide with the optical axis A. Therefore, the photographer can perform photographing in a state in which the holding position of the handle 4, the optical axis A, and the center 317 of the display section 31 substantially coincide with one another.

Note that as shown in FIG. 29B, when the display panel 3 in the first photographing position, the rotational axis 511a is in a position above the position of the upper end (side 352) of the display panel 3, and closer to the optical axis A than the side 353 in the right-left direction. Further, when the display panel 3 in the first photographing position, the rotational axis 512a is in a position closer to the optical axis A than the rotational axis 511a in the right-left direction. Further, as shown in FIG. 29C, the three rotating shaft members are positioned in the order of the rotating shaft members 513, 512, and 511 from the object side.

Figure 31A:
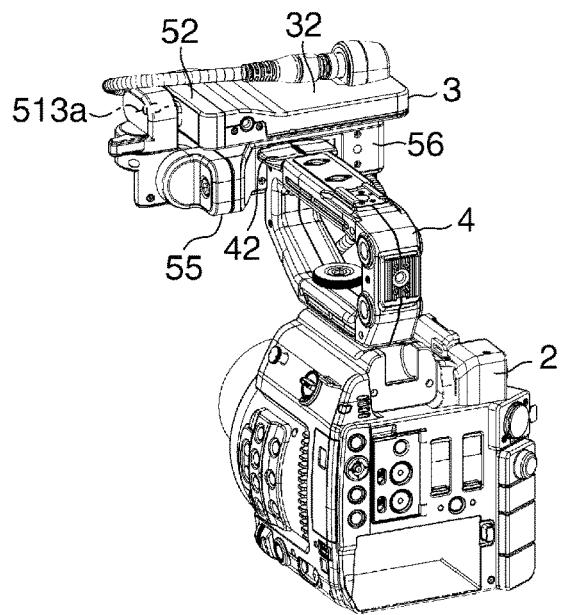
FIG. 31A is a perspective view of the image pickup system in a state in which the display panel is set to a first accommodated position.
Figure 31B:
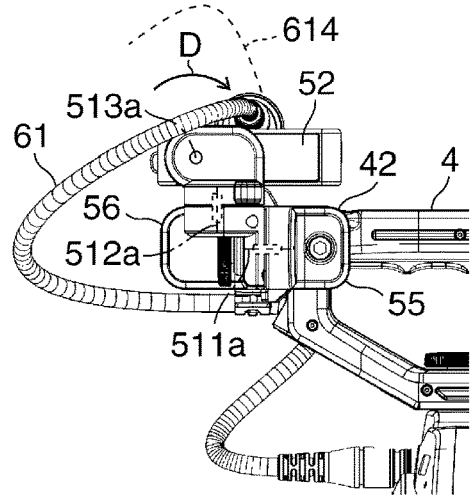
FIG. 31B is a partial left side view of the image pickup system in which the display panel is set to the first accommodated position.
Figure 31C:
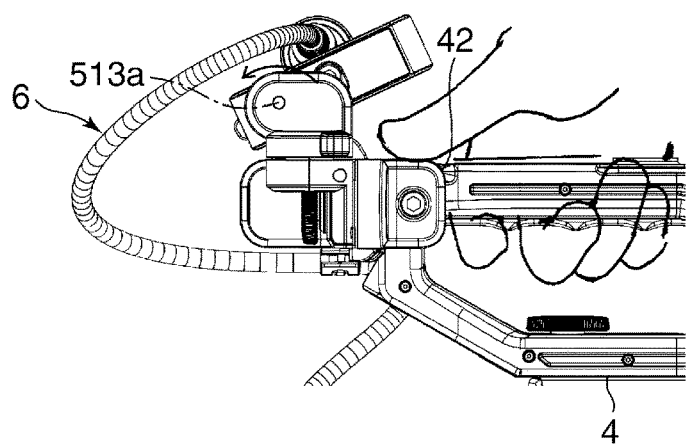
FIG. 31C is a partial left side view of the image pickup system in a state in which the display panel is held between the second photographing position and the first accommodated position.

FIGS. 31A, 31B, and 31C are a perspective view, a partial left side view, and a partial left side view of the main body unit 100, when the display panel 3 is in the first accommodated position. In the first accommodated position, the display panel 3 is positioned above the handle 4, and the display section 31 is opposed to the base unit 56 and the handle 4. When the arm portion 52 is rotated about the rotational axis 513a in a direction indicated by an arrow D in FIG. 31B (clockwise direction as viewed from the left) from the second photographing position (see FIGS. 30A and 30B), the display panel 3 is shifted to the first accommodated position. Assuming that the signal cable 6 is extended to be bent outward from the rear surface 32, the flexible portion 61A largely protrudes from the display panel 3 (denoted by reference numeral 614 in FIG. 31B). However, in the present embodiment, the signal cable 6 extends toward the side 353 in substantially parallel with the rear surface 32. Therefore, the area occupied by the flexible portion 61A when the signal cable 6 is moved about the rotational axis 513a can be made small.

Not that the rotating shaft members 511, 512, and 513 each have a fixed resistive torque, and can hold the display panel 3 in a desired position. Therefore, as shown in FIG. 31C, the display panel 3 can be held in a position between the second photographing position and the first accommodated position, and by thus causing the finger hooking portion 42 to be exposed, the photographer can easily carry the apparatus by holding the handle 4 by hand.

Figure 32A:
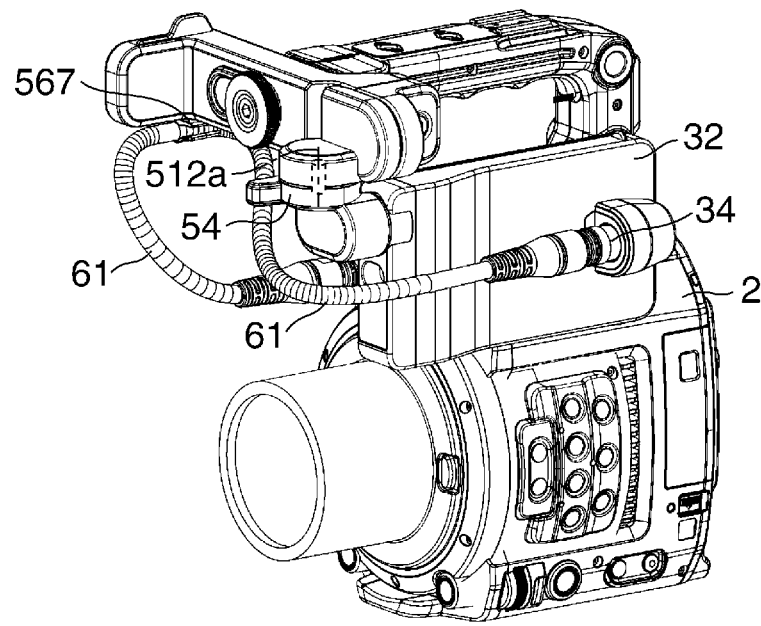
FIG. 32A is a perspective view of the image pickup system in a state in which the display panel is set to a second accommodated position.
Figure 32B:
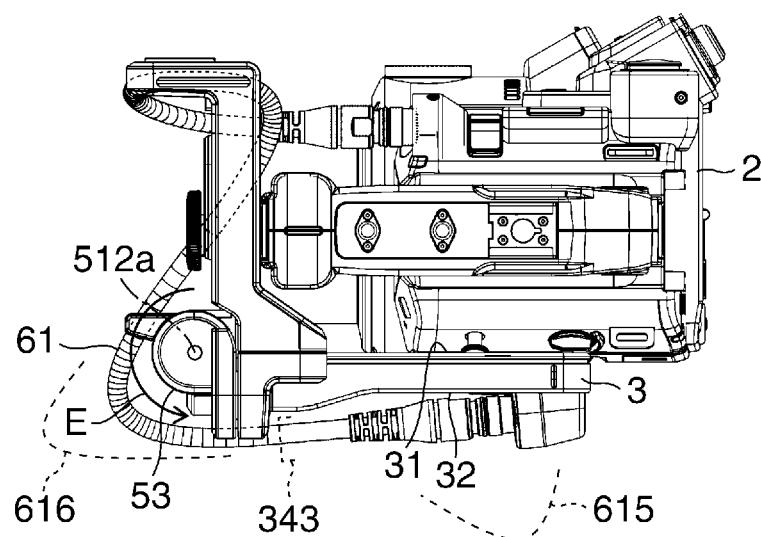
FIG. 32B is a top view of the image pickup system in a state in which the display panel is set to the second accommodated position.

FIGS. 32A and 32B are a perspective view and a top view of the main body unit 100 in the second accommodated position of the display panel 3, respectively. In the second accommodated position, the display section 31 is positioned beside (on the left side of) the handle 4, and is opposed to the handle 4. When the arm portion 53 is rotated about the rotational axis 512a in a direction, indicated by an arrow E in FIG. 32B (anticlockwise direction as viewed from above), from the first photographing position (see FIGS. 29A to 29C), the display panel 3 is shifted to the second accommodated position. Assuming that the signal cable 6 is extended to be bent outward from the rear surface 32, the flexible portion 61A largely protrudes from the display panel 3 (denoted by reference numeral 615 in FIG. 32B). However, in the present embodiment, the signal cable 6 extends toward the side 353 in substantially parallel with the rear surface 32. Therefore, the area occupied by the flexible portion 61A when the signal cable 6 is moved about the rotational axis 512a can be made small.

Further, the side 351 is a free end with respect to the rotation about the rotational axis 512a. The connection terminal 34 is disposed close to this free end, and hence the area occupied by the flexible portion 61A can be made small. If the connection terminal 34 is disposed in another position (for example, a position denoted by reference numeral 343 in FIG. 32B), the flexible portion 61A protrudes from the display panel 3 (denoted by reference numeral 616 in FIG. 32B), which increases the area occupied by the flexible portion 61A, and makes it difficult to handle the flexible portion 61A.

According to the present embodiment, the signal cable 6 connected to the connection terminal 34 of the protruding portion 38 is arranged to extend in a direction toward a portion where the fixing portion 331 is disposed (toward the side 353) along the rear surface 32 of the display panel 3. This makes it possible to reduce the area occupied by the signal cable 6 when rotating the display panel 3, and make it easy to handle the signal cable 6. Further, since the direction of inserting and pulling the signal cable 6 into and out of the connection terminal 34 is substantially parallel to the rear surface 32, it is possible to reduce the area occupied by the signal cable 6 in the thickness direction of the display panel 3. Further, since the direction in which the signal cable 6 extends from the connection terminal 34 has the gradient 36 with respect to the rear surface 32 such that signal cable 6 extends while avoiding the rising portion 321, interference between the rising portion 321 and the signal cable 6 is avoided.

Further, the fixing portion 331 overlaps with the display section 31 as viewed from the direction perpendicular to the display section 31, and hence it is possible to reduce the length of the display panel 3 in the longitudinal direction. From this point of view, the fixing portion 331 may be configured such that at least part of the fixing portion 331 overlaps with the display section 31.

Further, since the distance L1 is substantially equal to the distance L2 (see FIG. 29B), it is possible to make the position of the lower end of the display panel 3 close to the position of the upper end of the handle 4 in the second photographing position of the display panel 3 (see FIGS.

30A and 30B), and thereby make the image pickup system compact in the vertical direction.

Further, the user can shift the position of the display panel 3 between the side (first photographing position) and the above (second photographing position) of the main body unit 100 by rotating the display panel 3 about the rotational axis 511a, and hence it is possible to perform the rotation operation as the simple single operation.

Further, since the protruding portion 38, the signal cable 6, and the device 391 overlap with one another, as viewed from the direction perpendicular to the display section 31, it is possible to make the user's body difficult to touch the high temperature part. Note that from this point of view, the protruding portion 38, the signal cable 6, and the device 391 may be arranged such that at least one of shadows of the protruding portion 38, the flexible portion 61A of the signal cable 6, and the holding portion 62 of the signal cable 6, imaginarily projected in the direction perpendicular to the display section 31, partially overlap with the high temperature area. Further, the main heat generating component is not limited to the device 391 for processing signals.

Focusing only on the effect of reducing the area occupied by the signal cable 6 and making it easy to handle the signal cable 6 when rotating the display panel 3, the hinge unit 5 is only required to have at least one rotational axis.

Note that the image pickup system of the present invention may be formed as a system in which part or all of the components of the above-described image pickup system is disposed on the other side of a bilaterally symmetrical arrangement. For example, although in the first photographing position and the first accommodated position, the display panel 3 is positioned on the left side of the handle 4 of the main body unit 100, the display panel 3 may be positioned on the right side of the handle 4.

Note that the handle 4 is not necessarily required to be included in the main body unit 100. Therefore, the hinge unit 5 may be configured to be connectable to the apparatus body 2. The example of the accessory group is not limited to the display panel 3, but the present invention can be applied to a type of accessories in which the temperature of an exterior cover is increased when using a lighting unit or the like.

Next, a description will be given of an image pickup system according to a fifth embodiment of the present invention with reference to FIGS. 33 to 39. Components corresponding to those of the fourth embodiment are denoted by the same reference numerals.

Figure 33:
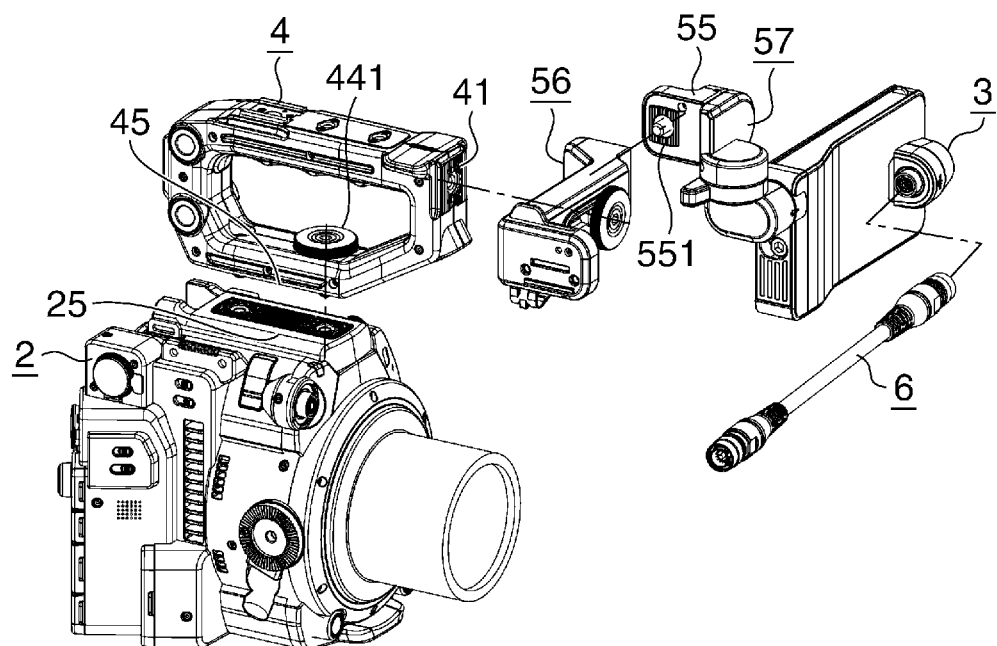
FIG. 33 is an exploded perspective view of an image pickup system according to a fifth embodiment of the present invention.
Figure 34:
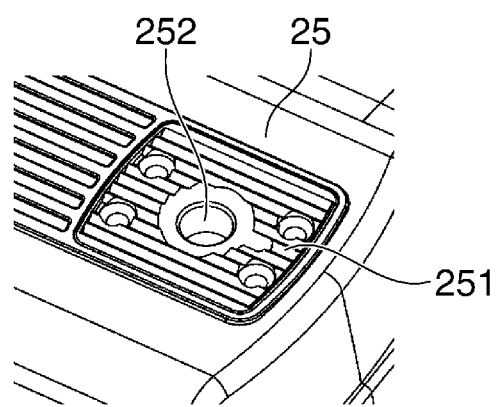
FIG. 34 is a partial perspective view of the apparatus body, as viewed from above.
Figure 35:
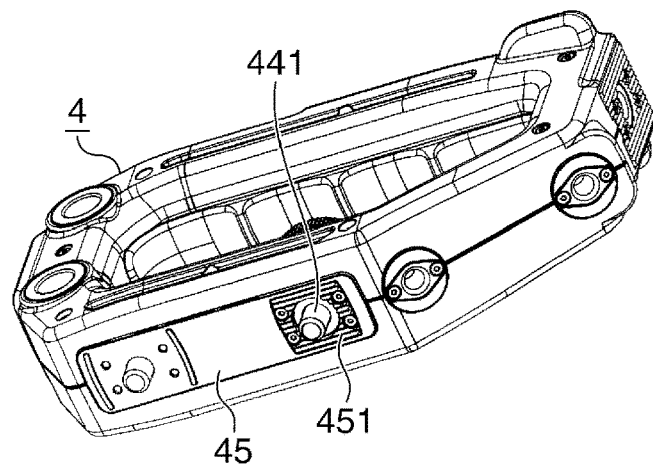
FIG. 35 is a perspective view of the handle, as viewed from the bottom.
Figure 36:
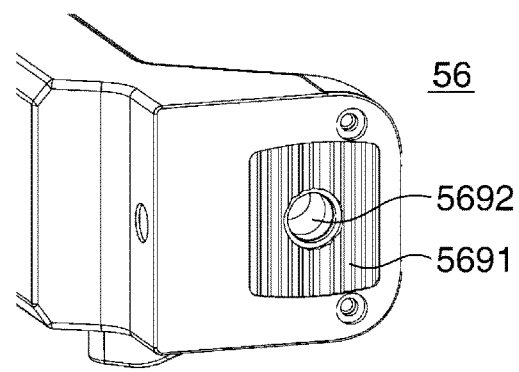
FIG. 36 is a perspective view showing a plurality of V-shaped portions and a screw hole, formed in a hinge base.
Figure 37:
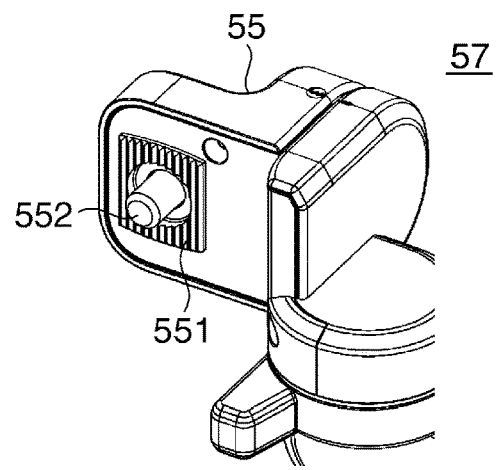
FIG. 37 is a perspective view showing a plurality of inverted V-shaped portions and a screw portion, formed in an arm portion of a hinge sub unit.
Figure 38:
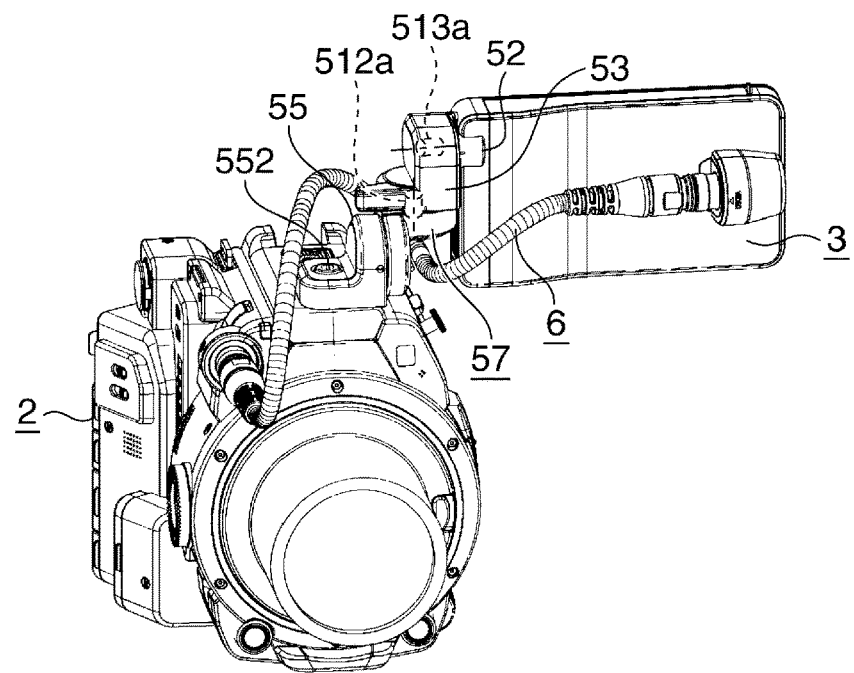
FIG. 38 is a perspective view of the image pickup system in a state in which the hinge sub unit to which a display panel unit is attached is directly attached to the apparatus body.
Figure 39:
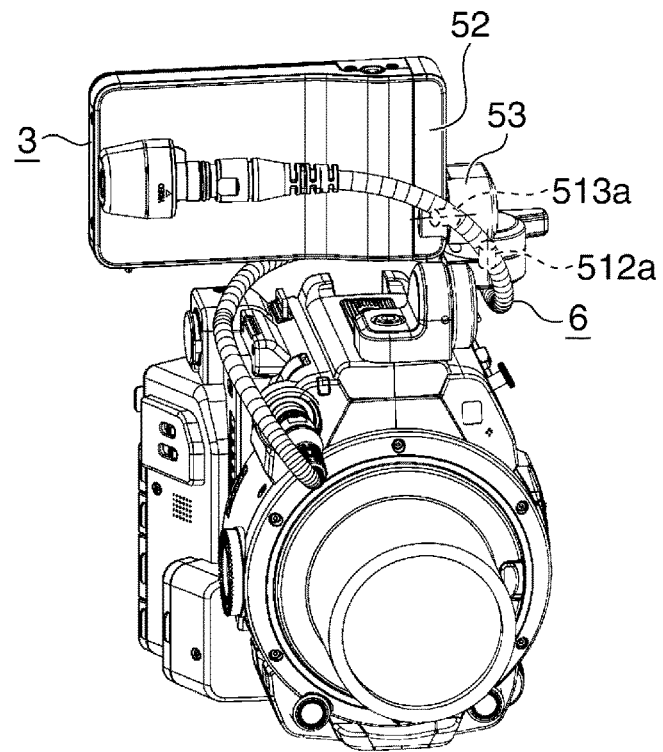
FIG. 39 is a perspective view of the image pickup system in a state in which the display panel unit is rotated through 180° in an opening/closing direction from the state shown in FIG. 38, and is further rotated through 180° in a rotational direction.

FIG. 33 is an exploded perspective view of the image pickup system according to the fifth embodiment. FIG. 34 is a partial perspective view of the apparatus body 2, as viewed from above. FIG. 35 is a perspective view of the handle 4, as viewed from the bottom. FIG. 36 is a perspective view showing a plurality of V-shaped portions 5691 and a screw hole 5692, formed in the base unit 56. FIG. 37 is a perspective view showing a plurality of inverted V-shaped portions 551 and a screw portion 552, formed on the arm portion 55 of the hinge sub unit 57. FIG. 38 is a perspective view of the image pickup system in a state in which the hinge sub unit 57 having the display panel 3 attached thereto is directly attached to the apparatus body 2. FIG. 39 is a perspective view of the image pickup system in a state in which the display panel 3 has been rotated through 180° in an opening/closing direction from the state shown in FIG. 38, and further rotated through 180° in a rotational direction.

In the image pickup system according to the present embodiment, as shown in FIG. 33, the apparatus body 2, the handle 4, the base unit 56, the hinge sub unit 57, and the display panel 3 can be separated from and coupled to one another by fastening with the screws. As shown in FIGS. 34 and 35, the handle 4 is positioned with respect to the apparatus body 2 by engaging a plurality of inverted V-shaped portions 451 formed in a bottom 45 of the handle 4 with a plurality of V-shaped portions 251 formed on a top 25 of the apparatus body 2, and is fixed to the apparatus body 2 by fastening a screw 441 in a screw hole 252.

Further, the hinge sub unit 57 is positioned with respect to the base unit 56 by engaging the plurality of inverted V-shaped portions 551 formed on the arm portion 55, as shown in FIG. 37, with the plurality of V-shaped portions 5691 formed in the base unit 56, as shown in FIG. 36, and the screw portion 552 is screwed in the screw hole 5692. As a result, the hinge sub unit 57 is fixed to the base unit 56. Here, the inverted V-shaped portions 451 and the inverted V-shaped portions 551 are formed into the same shape, and hence it is possible to position the hinge sub unit 57 to the apparatus body 2, and fix the hinge sub unit 57 to the apparatus body 2 by fastening the screw portion 552.

FIG. 38 shows the image pickup system in the state in which the hinge sub unit 57 having the display panel 3 attached thereto is directly attached to the apparatus body 2, and the signal cable 6 can be flexibly positioned in accordance with the postures of the display panel 3 and the hinge sub unit 57.

Further, FIG. 39 shows the image pickup system in the state in which the arm portion 52 is rotated about the rotational axis 513a through 180° from the state shown in FIG. 38, and the arm portion 53 is rotated about the rotational axis 512a through 180°. As mentioned above, even when the display panel 3 and the hinge sub unit 57 are directly attached to the apparatus body 2, it is possible to set the display panel to any of the various positions. Other components and advantageous effects are the same as those provided by the fourth embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Note that the material, the shape, the size, the form, the number, and the arrangement position of each member described in the embodiments by way of example can be changed without departing from the spirit and scope of the present invention.

This application claims the benefit of Japanese Patent Application No. 2017-059172 filed Mar. 24, 2017, Japanese Patent Application No. 2017-059171 filed Mar. 24, 2017, Japanese Patent Application No. 2017-059173 filed Mar. 24, 2017, and Japanese Patent Application No. 2017-147967 filed Jul. 31, 2017, which are hereby incorporated by reference herein in their entirety.

What is claimed is:

1. An accessory being removably attached to an image pickup apparatus, the image pickup apparatus including two fastening portions and two first fitting portions corresponding to the two fastening portions, the accessory comprising:
   two insertion holes into which can be inserted two respective fastening members in association with the two fastening portions; and
   a second fitting portion provided with only one of the two insertion holes so as to allow for protrusion-recess fitting with either one of the two first fitting portions.

2. The accessory according to claim 1, wherein the first fitting portion and the second fitting portion each comprise a plurality of protruding strips juxtaposed in a direction perpendicular to the optical axis and each extending in a direction of the optical axis.

3. The accessory according to claim 2, wherein the protruding strips each have a triangular shape in cross-section.

4. The accessory according to claim 3, wherein a vertex of each protruding strip of one of the first fitting portion and the second fitting portion is disposed in phase with a centerline of the fastening members.

5. The accessory according to claim 1, wherein each fastening member is a screw member, and each fastening portion is a screw hole associated with the screw member.

6. The accessory according to claim 1, wherein the accessory includes a holding portion held by a user.

7. An accessory being removably attached to an image pickup apparatus, the image pickup apparatus including two first fitting portions each having a surface formed into a plurality of triangular wave shapes, the accessory comprising:
   a second fitting portion provided so as to allow for protrusion-recess fitting with either one of the two first fitting portions in a state in which the accessory is attached to the image pickup apparatus and having a surface formed into a plurality of triangular shapes.

8. The accessory according to claim 7, wherein the second fitting portion has an insertion hole in which a bolt-shaped fastening member is inserted,
   wherein the first fitting portion has a screw hole, and
   wherein by fastening the bolt-shaped fastening member to the screw hole, fitted state between the second fitting portion and the first fitting portion is maintained.

9. The accessory according to claim 7, wherein the triangular wave shapes form a shape symmetrical with respect to a connection portion.

10. The accessory according to claim 7, wherein the accessory includes a holding portion held by a user.

11. An image pickup system comprising an image pickup apparatus including two fastening portions and two first fitting portions corresponding to the two fastening portions, and an accessory being removably attached to the image pickup apparatus,
   the accessory comprising:
   two insertion holes into which can be inserted two respective fastening members in association with the two fastening portions; and
   a second fitting portion provided with only one of the two insertion holes so as to allow for protrusion-recess fitting with either one of the two first fitting portions.

12. The image pickup system according to claim 11, wherein the first fitting portion and the second fitting portion each comprise a plurality of protruding strips juxtaposed in a direction perpendicular to the optical axis and each extending in a direction of the optical axis.

13. The image pickup system according to claim 12, wherein the protruding strips each have a triangular shape in cross-section.

14. The image pickup system according to claim 13, wherein a vertex of each protruding strip of one of the first fitting portion and the second fitting portion is disposed in phase with a centerline of the fastening members.

15. The image pickup system according to claim 11, wherein each fastening member is a screw member, and each fastening portion is a screw hole associated with the screw member.

16. The image pickup system according to claim 11, wherein the accessory includes a holding portion held by a user.

17. An image pickup system comprising an image pickup apparatus including two first fitting portions each having a surface formed into a plurality of triangular wave shapes, and an accessory being removably attached to the image pickup apparatus,
   the accessory comprising:
   a second fitting portion provided so as to allow for protrusion-recess fitting with either one of the two first fitting portions in a state in which the accessory is attached to the image pickup apparatus and having a surface formed into a plurality of triangular shapes.

18. The image pickup system according to claim 17, wherein the second fitting portion has an insertion hole in which a bolt-shaped fastening member is inserted,
   wherein the first fitting portion has a screw hole, and
   wherein by fastening the bolt-shaped fastening member to the screw hole, fitted state between the second fitting portion and the first fitting portion is maintained.

19. The image pickup system according to claim 17, wherein the triangular wave shapes form a shape symmetrical with respect to a connection portion.

20. The image pickup system according to claim 17, wherein the accessory includes a holding portion held by a user.

21. An accessory being removably attached to an image pickup apparatus, the image pickup apparatus including at least one fastening portion and at least one first fitting portion corresponding to the at least one fastening portion, the accessory comprising:
   at least one insertion hole into which can be inserted at least one respective fastening member in association with the at least one fastening portion; and
   a second fitting portion provided so as to allow for protrusion-recess fitting with the at least one first fitting portion,
   wherein the first fitting portion and the second fitting portion each comprise a plurality of protruding strips juxtaposed in a direction perpendicular to the optical axis and each extending in a direction of the optical axis.

22. The accessory according to claim 21, wherein the protruding strips each have a triangular shape in cross-section.

23. The accessory according to claim 22, wherein a vertex of each protruding strip of one of the first fitting portion and the second fitting portion is disposed in phase with a centerline of the fastening members.

24. The accessory according to claim 21, wherein each fastening member is a screw member, and each fastening portion is a screw hole associated with the screw member.

25. The accessory according to claim 21, wherein the accessory includes a holding portion held by a user.

26. An accessory being removably attached to an image pickup apparatus, the image pickup apparatus including at least one first fitting portion each having a surface formed into a plurality of triangular wave shapes, the accessory comprising:
   a second fitting portion provided so as to allow for protrusion-recess fitting with the at least one first fitting portion in a state in which the accessory is attached to the image pickup apparatus and having a surface formed into a plurality of triangular shapes.

27. The accessory according to claim 26, wherein the second fitting portion has an insertion hole in which a bolt-shaped fastening member is inserted,
wherein the first fitting portion has a screw hole, and
wherein by fastening the bolt-shaped fastening member to the screw hole, fitted state between the second fitting portion and the first fitting portion is maintained.

28. The accessory according to claim 26, wherein the triangular wave shapes form a shape symmetrical with respect to a connection portion.

29. The accessory according to claim 26, wherein the accessory includes a holding portion held by a user.

30. An image pickup apparatus to which an accessory including at least one insertion hole into which can be inserted at least one respective fastening member and at least one first fitting portion is removably attached, the image pickup apparatus comprising:
at least one fastening portion provided in association with the at least one insertion hole; and
a second fitting portion provided so as to allow for protrusion-recess fitting with the at least one first fitting portion corresponding to the at least one fastening portion,
wherein the first fitting portion and the second fitting portion each comprise a plurality of protruding strips juxtaposed in a direction perpendicular to the optical axis and each extending in a direction of the optical axis.

31. The image pickup apparatus according to claim 30, wherein the protruding strips each have a triangular shape in cross-section.

32. The image pickup apparatus according to claim 31, wherein a vertex of each protruding strip of one of the first fitting portion and the second fitting portion is disposed in phase with a centerline of the fastening members.

33. The image pickup apparatus according to claim 30, wherein each fastening member is a screw member, and each fastening portion is a screw hole associated with the screw member.

34. An image pickup apparatus to which an accessory including at least one first fitting portion each having a surface formed into a plurality of triangular wave shapes is removably attached, the image pickup apparatus comprising:
a second fitting portion provided so as to allow for protrusion-recess fitting with the at least one first fitting portion in a state in which the accessory is attached to the image pickup apparatus and having a surface formed into a plurality of triangular shapes.

35. The image pickup apparatus according to claim 34, wherein the first fitting portion has an insertion hole in which a bolt-shaped fastening member is inserted,
wherein the second fitting portion has a screw hole, and
wherein by fastening the bolt-shaped fastening member to the screw hole, fitted state between the first fitting portion and the second fitting portion is maintained.

36. The image pickup apparatus according to claim 34, wherein the triangular wave shapes form a shape symmetrical with respect to a connection portion.

37. An image pickup system comprising an image pickup apparatus including at least one fastening portion and at least one first fitting portion corresponding to the at least one fastening portion, and an accessory being removably attached to the image pickup apparatus,
the accessory comprising:
at least one insertion hole into which can be inserted at least one respective fastening member in association with the at least one fastening portion; and
a second fitting portion provided so as to allow for protrusion-recess fitting with the at least one first fitting portion,
wherein the first fitting portion and the second fitting portion each comprise a plurality of protruding strips juxtaposed in a direction perpendicular to the optical axis and each extending in a direction of the optical axis.

38. The image pickup system according to claim 37, wherein the protruding strips each have a triangular shape in cross-section.

39. The image pickup system according to claim 38, wherein a vertex of each protruding strip of one of the first fitting portion and the second fitting portion is disposed in phase with a centerline of the fastening members.

40. The image pickup system according to claim 37, wherein each fastening member is a screw member, and each fastening portion is a screw hole associated with the screw member.

41. The image pickup system according to claim 37, wherein the accessory includes a holding portion held by a user.

42. An image pickup system comprising an image pickup apparatus including at least one first fitting portion each having a surface formed into a plurality of triangular wave shapes, and an accessory being removably attached to the image pickup apparatus,
the accessory comprising:
a second fitting portion provided so as to allow for protrusion-recess fitting with the at least one first fitting portion in a state in which the accessory is attached to the image pickup apparatus and having a surface formed into a plurality of triangular shapes.

43. The image pickup system according to claim 42, wherein the second fitting portion has an insertion hole in which a bolt-shaped fastening member is inserted,
wherein the first fitting portion has a screw hole, and
wherein by fastening the bolt-shaped fastening member to the screw hole, fitted state between the second fitting portion and the first fitting portion is maintained.

44. The image pickup system according to claim 42, wherein the triangular wave shapes form a shape symmetrical with respect to a connection portion.

45. The image pickup system according to claim 42, wherein the accessory includes a holding portion held by a user.

* * * * *